(12) United States Patent
Dimsdle

(10) Patent No.: US 7,239,674 B2
(45) Date of Patent: Jul. 3, 2007

(54) METHOD OF DIFFERENTIAL-PHASE/ABSOLUTE-AMPLITUDE QAM

(75) Inventor: Jeffrey William Dimsdle, Overland Park, KS (US)

(73) Assignee: Honeywell Federal Manufacturing & Technologies, LLC, Kansas City, MO (US)

( * ) Notice: Subject to any disclaimer, the term of this patent is extended or adjusted under 35 U.S.C. 154(b) by 831 days.

(21) Appl. No.: 10/454,805

(22) Filed: Jun. 4, 2003

(65) Prior Publication Data

US 2004/0247048 A1 Dec. 9, 2004

(51) Int. Cl.
*H04L 27/16* (2006.01)
(52) U.S. Cl. ...................... 375/326; 375/350
(58) Field of Classification Search ............... 375/326, 375/340, 316, 261, 298, 324, 350, 315; 329/304
See application file for complete search history.

(56) References Cited

U.S. PATENT DOCUMENTS

| | | | |
|---|---|---|---|
| 5,621,762 A * | 4/1997 | Miller et al. ............... | 375/298 |
| 5,633,898 A * | 5/1997 | Kishigami et al. .......... | 375/344 |
| 5,768,307 A | 6/1998 | Schramm et al. | |
| 5,809,009 A | 9/1998 | Matsuoka et al. | |
| 5,872,810 A | 2/1999 | Philips et al. | |
| 6,434,188 B1 * | 8/2002 | Hwang et al. ............... | 375/222 |
| 6,636,555 B1 * | 10/2003 | Frank et al. ................. | 375/146 |
| 6,664,849 B1 * | 12/2003 | Taura et al. ................. | 329/315 |
| 6,744,827 B1 * | 6/2004 | Vandenabeele et al. ..... | 375/320 |
| 7,031,405 B1 * | 4/2006 | Touzni et al. ............... | 375/326 |
| 2001/0050948 A1 * | 12/2001 | Ramberg et al. ............ | 375/148 |
| 2002/0168005 A1 * | 11/2002 | Collins et al. ......... | 375/240.01 |

FOREIGN PATENT DOCUMENTS

EP 0308891 1/1994

OTHER PUBLICATIONS

E. Issman and W.T. Webb. *Carrier Recover For 16 Level Qam In Mobile Raido.* Coll Digest IEE No. 045, Mar. 1990.

* cited by examiner

*Primary Examiner*—Dac V. Ha
(74) *Attorney, Agent, or Firm*—Hovey Williams, LLP

(57) ABSTRACT

A method of quadrature amplitude modulation involving encoding phase differentially and amplitude absolutely, allowing for a high data rate and spectral efficiency in data transmission and other communication applications, and allowing for amplitude scaling to facilitate data recovery; amplitude scale tracking to track-out rapid and severe scale variations and facilitate successful demodulation and data retrieval; $2^N$ power carrier recovery; incoherent demodulation where coherent carrier recovery is not possible or practical due to signal degradation; coherent demodulation; multipath equalization to equalize frequency dependent multipath; and demodulation filtering.

23 Claims, 13 Drawing Sheets

METHOD OF DIFFERENTIAL-PHASE/ABSOLUTE-AMPLITUDE QAM

FEDERALLY SPONSORED RESEARCH OR DEVELOPMENT PROGRAM

The present invention was developed with support from the U.S. government under Contract No. DE-AC04-01AL66850 with the U.S. Department of Energy. Accordingly, the U.S. government has certain rights in the present invention.

BACKGROUND OF THE INVENTION

1. Field of the Invention

The present invention relates broadly to methods of signal modulation and demodulation, particularly methods of quadrature amplitude modulation, for facilitating data transmission and other communication applications. More particularly, the present invention concerns a method of quadrature amplitude modulation involving encoding phase differentially and amplitude absolutely to achieve a high data rate and spectral efficiency in data transmission and other communication applications, and also for allowing amplitude scaling to facilitate data recovery; amplitude scale tracking; $2^N$ power carrier recovery; incoherent demodulation; coherent demodulation; multipath equalization; and demodulation filtering.

2. Description of the Prior Art

It is often desirable to maximize data rate and spectral efficiency in communication applications. Quadrature amplitude modulation (QAM), for example, is one means of doing so. QAM is a well-known modulation method combining amplitude and phase modulation in which two sinusoidal carriers, one exactly 90° or ¼ cycle out of phase with respect to the other, are used to transmit data over a single channel. Because the carriers differ by a 90° phase shift, they are orthogonal and can be modulated independently, transmitted over the same frequency band, and separated during demodulation at the receiver. Thus, for a given available bandwidth, QAM enables higher data transmission rates than other prior art modulation methods. QAM and its derivatives are used in mobile radio and satellite communication systems and other wireless and cable data transmission applications.

Prior art QAM methods, however, suffer from a number of problems and disadvantages, including, for example, that they typically encode both amplitude and phase absolutely and do not allow for continuous referencing. Furthermore, prior art methods typically do not satisfactorily address changes in signal strength or rapid and severe scale variations, and therefore do not facilitate successful signal demodulation and data retrieval under such conditions. Additionally, prior art methods typically do not satisfactorily allow for incoherent carrier recovery when coherent recovery is impossible due to signal degradation. Additionally, prior art methods typically do not satisfactorily address multipath equalization under conditions of severe frequency dependent fading.

It should be noted that while references to so-called "differential" QAM methods can be found in prior art literature, these methods are related to bit assignment and typically continue to require coherent demodulation or involve amplitude ratioing which sacrifices bit-error-rate (BER) performance.

Due to the above-identified and other problems and disadvantages in the art, a need exists for an improved method of signal modulation and demodulation for maximizing data rate and spectral efficiency in data transmission and other communication applications

SUMMARY OF THE INVENTION

The present invention overcomes the above-described and other problems and disadvantages in the prior art by providing a method of QAM involving encoding phase differentially and amplitude absolutely to achieve a high data rate and spectral efficiency in data transmission and other communication applications with minimum sacrifice in BER while still allowing for amplitude scaling to facilitate data recovery; amplitude scale tracking to track-out rapid and severe scale variations; $2^N$ power carrier recovery for carrier frequency recovery; incoherent demodulation where coherent carrier recovery is not possible or practical due to signal degradation; improved coherent demodulation; multipath equalization to equalize frequency dependent multipath; and demodulation filtering.

Method of Encoding Phase Differentially and Amplitude Absolutely for Differential-Phase/Absolute Amplitude QAM.

The method includes a technique for encoding phase differentially and amplitude absolutely, involving two constellations: an absolute-phase/absolute-amplitude constellation and a differential-phase/absolute-amplitude pseudo-constellation. The absolute constellation, in which not all transitions between states are allowed, is the constellation of the actual absolute referenced IQ states transmitted, plotting a present phase and a present amplitude from a present absolute-amplitude/absolute-phase state being transmitted. In contrast, the differential pseudo-constellation plots a change in phase from a previous absolute-amplitude/absolute-phase state transmitted to the present absolute-amplitude/absolute-phase state being transmitted, and plots the absolute amplitude level of the present absolute-amplitude/absolute-phase state being transmitted. The absolute constellation is used to generate the differential pseudo-constellation which represents, with fewer points, the symbols transmitted. Bit assignments are made for each point in the differential pseudo-constellation.

It should be noted that the present differential-phase/absolute-amplitude QAM method is entirely different from the so-called "differential" QAM methods referenced in prior art literature. While the latter relates to bit assignment and continues to require coherent demodulation or involves amplitude ratioing with BER sacrifice, the present method involves phase being directly differentially encoded completely independent of bit assignments to the different states while amplitude remains absolute. In the present method, any arbitrary bit assignment could be made, but a Gray or "semi"-Gray code assignment (perfect Gray coding is not possible for a polar constellation) would normally be used to minimize BER. Thus, the present method, involving a hybrid of differential and absolute referencing, is distinguished from and an improvement over prior art QAM methods involving only absolute referencing.

Amplitude Scaling Using Amplitude Transitions.

The method also includes an amplitude scaling technique using amplitude transitions for scaling the amplitudes of the differential pseudo-constellation, thereby advantageously facilitating data recovery. Broadly, an amplitude transition, whether higher-to-lower or lower-to-higher, between the previous state and the present state is examined to identify an actual amplitude level. Then, a scale factor is calculated by dividing a normalized ideal amplitude level by the actual amplitude level. This process is repeated to result in a plurality of scale factors. Next, the plurality of scale factors are averaged to produce an average scale factor, and, lastly, the average scale factor is used to scale the amplitudes of the differential pseudo-constellation Amplitude Scale Tracking Using Amplitude Transitions.

The method also includes an amplitude scale tracking technique for tracking-out rapid and severe scale variations in the received multiple amplitude level QAM signal, thereby advantageously facilitating successful signal demodulation and data retrieval. Broadly, scaling for tracking-out the scale variations is determined based upon legitimate higher-to-lower or lower-to-higher transitions in the signal to identify known amplitude levels. Those transitions whose ratio is within a pre-established tolerance of a nominal ratio of a pair of amplitude levels, the transition between which is being searched, are considered to be known transitions between those amplitude levels, and therefore known sample amplitude levels can be identified and used for determining scale factors by dividing a normalized ideal amplitude level by the actual amplitude level. Lastly, each symbol sample magnitude is multiplied by a weighted average of scale factors with greater weight being given to scale factors determined from symbol amplitudes closest to the symbol amplitude being scaled. In this manner, changes in signal strength are compensated.

Amplitude Scaling Using Amplitude Maximums.

The method also includes an alternative amplitude scaling technique using amplitude maximums. Broadly, ideal constellation amplitude magnitudes are first chosen. Then, the ideal ratio of each constellation amplitude magnitude to the outer level constellation magnitude is determined. Next, upper and lower limits are established around each ideal ratio value. Then, for a given signal segment to be scaled, the maximum amplitude magnitude over the entire segment is determined. Next, for each symbol sample, the ratio of the symbol sample magnitude to the maximum magnitude over the entire segment is determined. If this ratio is within the established upper and lower limits, corresponding to a given ideal magnitude level, then that point can be identified as being of that ideal magnitude level. That ideal magnitude level is then divided by the magnitude of that symbol sample point identified as being of that ideal magnitude level to obtain a scale factor. This process is repeated for all symbol samples within the signal segment, thereby generating a plurality of scale factors. The plurality of scale factors are then averaged to determine an amplitude scale factor for the entire signal segment. Lastly, all symbol sample magnitudes within the signal segment are multiplied by the average amplitude scale factor.

$2^N$ Power Carrier Recovery.

The method also includes a $2^N$ power carrier recovery technique for recovering a carrier signal from the modulated signal alone and without benefit of a pilot carrier wave, thereby advantageously facilitating demodulation of the QAM signal and retrieval of the data. Broadly, the signal is first bandpass pre-filtered around an intermediate frequency.

A limit amplitude value is determined as follows. The absolute value of the bandpass pre-filtered signal is determined. Then, the mean is determined and divided by a user-selected divisor to obtain a limit amplitude value which is near the lowest constellation amplitude level.

The original bandpass pre-filtered signal is up-sampled to increase the Nyquist rate. Next, this up-sampled signal's positive and negative amplitude swings are either hard or soft limited to the limit amplitude value.

Two alternative loop paths are then available. On a first loop path (repeated N times, for i=1, 2, 3, . . . N), the signal is bandpass filtered from $2^{(i-1)}*$(start frequency) to $2^{(i-1)}*$(end frequency), and then squared. On a second loop path (repeated N times), the signal is bandstop filtered from $2^{N}*$(start frequency) to $2^{N}*$(end frequency), and then squared.

Two alternative end paths are then available. On a first end path, the signal is Fourier transformed. Then the peak response is found between $2^{N}*$(start frequency) and $2^{N}*$(end frequency). Lastly, the frequency corresponding to the peak response is divided by $2^N$, with the result being the carrier signal frequency. On a second end path, the signal is bandpass filtered from $2^{N}*$(start frequency) to $2^{N}*$(end frequency). Lastly, a frequency divide by $2^N$ operation is performed, with the result being the carrier signal frequency.

Coherent Demodulation.

The method also includes an improved coherent demodulation "N+" window technique for carrier recovery that advantageously provides significant improvement in BER versus Eb/No over incoherent demodulation. Broadly, for each set of N absolute-phase/absolute-amplitude constellation received states, each state is assigned to the nearest ideal absolute-phase/absolute-amplitude constellation point. If these represent a legal sequence of N−1 differential transition states, then those are the N−1 differential transition states tentatively assigned. Otherwise, the N−1 differential transition states tentatively assigned are based upon a sequence of lowest metric constellation states determined as follows. For each of the N absolute-phase/absolute-amplitude constellation states, it and the M adjacent states, for M+1 total states, are determined, resulting in $(M+1)^N$ possible combinations. These are then reduced to only those combinations that represent a sequence of N−1 valid differential transitions. Of these, the one with the lowest metric is tentatively chosen as the N−1 differential transition states or N absolute states. All of the previous steps are then repeated, each time advancing one state at a time through the received sequence such that each differential transition is assigned with associated metric N−1 times. Lastly, the metric is again applied and the one of the N−1 with the smallest associated metric is chosen as the actual differential state.

Incoherent Demodulation.

The method also includes an incoherent demodulation technique using "closest to" state assignment to advantageously accomplish carrier recovery when coherent carrier recovery is not possible or practical due to signal degradation. Broadly, the ideal points in the multi-state differential pseudo-constellation are determined. Thereafter, when a normalized point is received it is assigned to a closest one of the ideal points.

Transmitter Logic.

One possible implementation of transmitter logic for generating the desired differential-phase/absolute-amplitude symbols from the tuned absolute-phase/absolute-amplitude IQ constellation points is as follows. First, two look-up tables, Table A and Table B, are created. In Table A is a list of all the states in the differential pseudo-constellation, N=0 to C, where C is the total number of differential-phase/absolute-amplitude pseudo-constellation points−1, and where N is the number being transmitted with that symbol.

Corresponding to each element N are two representative integer numbers: a first number and a second number, with the first number, A, representing a corresponding amplitude level, and the second number, D, representing a number of differential phase increments. In Table B is a list of absolute constellation I values and a Q values, and a corresponding index number, T. In the following, $N_p$=total number of absolute-phase/absolute-amplitude phases. The smallest phase increment is ($360/N_p$).

When it is desired to transmit the bit pattern equal to the number N, the A and D numbers corresponding to N are looked-up in Table A. Then, an absolute phase, P(i), is determined per P(i)=P(i−1)+D, where P(i−1) is the previous value of P'(i). Next, when P(i) corresponds to a phase exceeding 360°, that is P(i)>$N_p$−1, then a revised P(i) value, P'(i), is generated per P'(i)=P(i)−$N_p$, so that the wraparound 360° is subtracted off. Otherwise, P'(i)=P(i). Then, a T value is determined as T=P'(i)+$N_p$*A. Lastly, the I and Q values corresponding to the T value are looked-up in Table B, and then sent to I and Q digital-to-analog converters.

Multipath Equalization.

The method also includes a multipath equalization technique for equalizing a frequency dependent multipath degraded signal to advantageously deal with moderate or severe conditions of frequency dependent fading so that data can be successfully recovered. Broadly, the multipath corrupted signal is received as an input signal. Then, the input signal is filtered using a trial equalization filter having a set of one or more filter parameters. The one or more filter parameters include Ai's, Di's and Pi's, where i=1 to M−1 to compensate M multipath signals. Ai is the fractional amplitude of the $i^{th}$ multipath signal relative to the line-of-sight (LOS) signal. Di is the relative delay between the $i^{th}$ multipath signal and the LOS signal. Pi is the relative angle between the $i^{th}$ multipath signal and the LOS signal. Next, an optimization criteria is determined from the filtered input signal. Thereafter, the process is repeated, each time varying the set of one or more filter parameters to obtain a potentially different optimization criteria value. Lastly, based on the various optimization criteria results obtained, the set of one or more filter parameters that results in an optimized optimization criteria value is selected and used to compensate the multipath corrupted signal and successfully equalize the frequency dependent multipath. It will be appreciated that these general steps can be used for both two-ray and M-ray modeled signals.

Demodulation Filtering.

The method also includes a technique for demodulation filtering. Broadly, an I signal portion and a Q signal portion of the QAM signal are downconverted. Then, a filter function is determined as a function of a weighted curve, giving greater weight to center and less weight to edge samples, and a transfer function of one or more transmitter I and Q baseband filters. Lastly, the I signal portion and the Q signal portion are filtered using the filter function to demodulate the QAM signal.

Advantages.

Thus, it will be appreciated that the method of the present invention provides a number of substantial advantages over the prior art, including, for example, providing continuous phase and amplitude referencing, wherein phase is encoded differentially and amplitude is encoded absolutely. Additionally, the method allows for scaling the amplitudes of the differential pseudo-constellation so that the signal can be demodulated. Additionally, the method allows for advantageously tracking-out rapid and severe scale variations in the received multiple amplitude level QAM signal so that the signal can be successfully demodulated and the data retrieved. Additionally, the method allows for incoherent carrier recovery when coherent recovery is impossible due to frequency variations in the signal, thereby advantageously facilitating demodulation of the QAM signal and retrieval of the data. Additionally, the method allows for coherent carrier recovery that advantageously provides significant improvement in BER versus Eb/No over incoherent demodulation. Additionally, the method advantageously allows for equalizing frequency dependent multipath to deal with rapid and severe conditions of frequency dependent fading so that data can be successfully recovered from, for example, a high-speed telemetry QAM signal. Additionally, the method allows for improved demodulation filtering These and other important features of the present invention are more fully described in the section titled DETAILED DESCRIPTION OF A PREFERRED EMBODIMENT, below.

BRIEF DESCRIPTION OF THE DRAWINGS

A preferred embodiment of the present invention is described in detail below with reference to the attached drawing figures, wherein.

DETAILED DESCRIPTION OF A PREFERRED EMBODIMENT

Referring to the figures, a method is disclosed in accordance with a preferred embodiment of the present invention. More particularly, the present invention concerns a method of QAM involving encoding phase differentially and amplitude absolutely to achieve a high data rate and spectral efficiency in data transmission and other communication applications, and allowing for amplitude scaling to facilitate data recovery; amplitude scale tracking to track-out rapid and severe scale variations and facilitate successful demodulation and data retrieval; $2^N$ power carrier recovery from modulated signal; incoherent demodulation where coherent carrier recovery is not possible or practical due to signal degradation; improved coherent demodulation; multipath equalization to equalize frequency dependent multipath; and demodulation filtering. Thus, the present method, involving a hybrid of differential and absolute referencing, is distinguished from and an improvement over prior art QAM methods involving only absolute referencing.

The present application incorporates by reference the contents of the following non-provisional patent applications: METHOD OF DIFFERENTIAL-PHASE/ABSOLUTE-AMPLITUDE QAM, Ser. No. 10/454,804, Filed Jun. 4, 2003; METHOD OF DIFFERENTIAL-PHASE/ABSOLUTE-AMPLITUDE QAM, Ser. No. 10/454,808, Filed Jun. 4, 2003; and METHOD OF DIFFERENTIAL-PHASE/ABSOLUTE-AMPLITUDE QAM, Ser. No. 10/454,811, Filed Jun. 4, 2003.

Encoding Phase Differentially and Amplitude Absolutely for Differential-Phase/Absolute Amplitude QAM.

The method includes a technique for encoding phase differentially and amplitude absolutely, involving two constellations: an absolute-phase/absolute-amplitude constellation and a differential-phase/absolute-amplitude pseudo-constellation. The absolute constellation, in which not all transitions between states are allowed, is the constellation of the actual absolute referenced IQ states transmitted, plotting a present phase and a present amplitude from a present absolute-amplitude/absolute-phase state being transmitted. In contrast, the differential pseudo-constellation plots a change in phase from a previous absolute-amplitude/absolute-phase state transmitted to the present absolute-amplitude/absolute-phase state being transmitted, and plots the absolute amplitude level of the present absolute-amplitude/absolute-phase state being transmitted. The absolute constellation is used to generate the differential pseudo-constellation which represents, with fewer points, the symbols transmitted. Bit assignments are made for each point in the differential pseudo-constellation.

Figure 1:
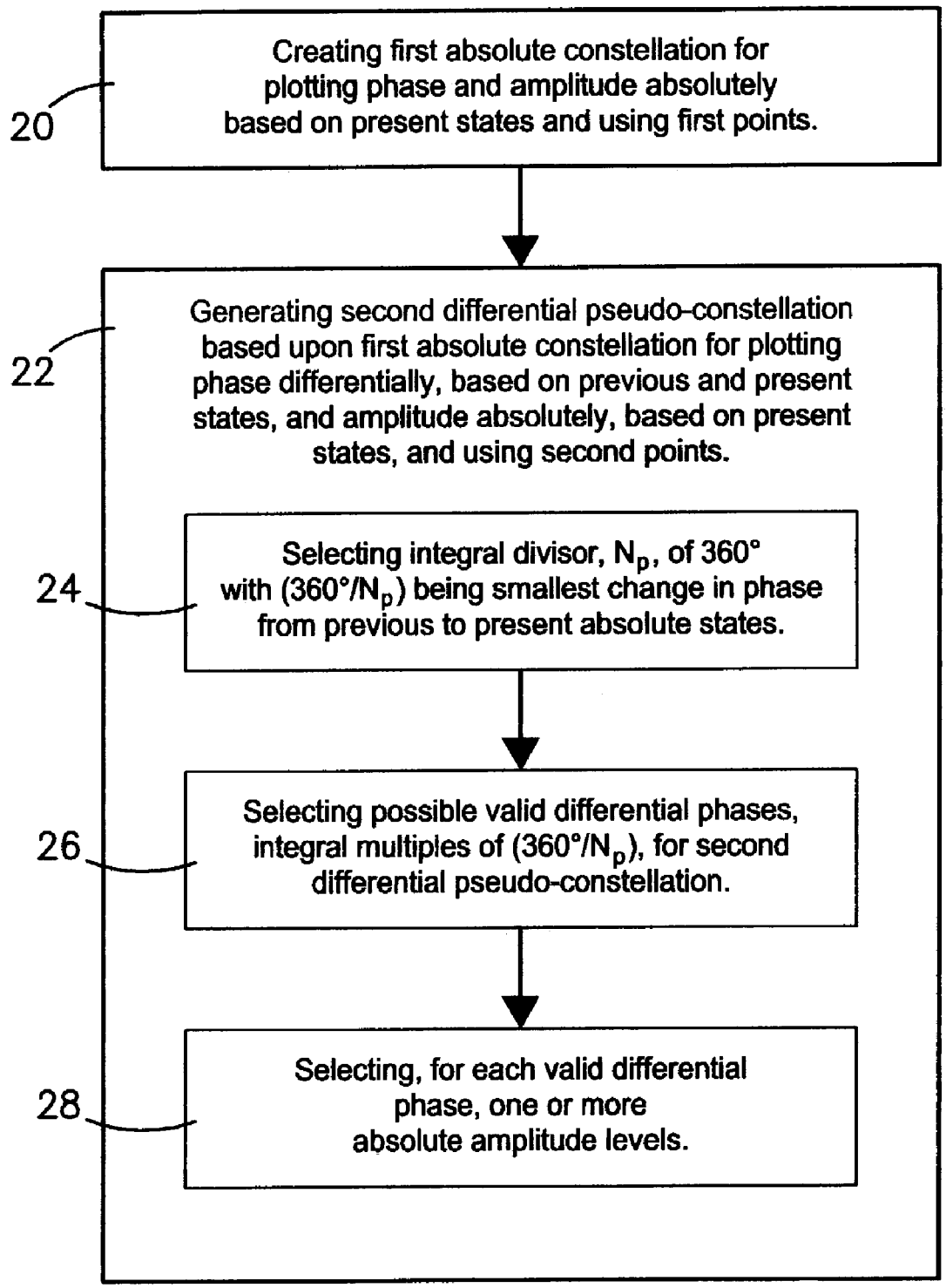
FIG. 1 is a block diagram of steps involved in a preferred embodiment of the method concerning a technique for encoding phase differentially and amplitude absolutely.

The technique can be broadly characterized as follows. First, referring to FIG. 1, a first absolute constellation, being the absolute-phase/absolute-amplitude constellation, is created plotting the present phase absolutely and the present amplitude absolutely using a plurality of first points, as depicted in box 20. Then, a second differential pseudo-constellation, being the differential-phase/absolute-amplitude pseudo-constellation, is generated based upon the first absolute constellation and using a plurality of second points which are fewer in number than the plurality of first points, as depicted in box 22. The second differential pseudo-constellation plots a change in phase between previous and present phases differentially and plots the present amplitude absolutely.

The differential pseudo-constellation points are determined as follows. First, an integral divisor of 360° is chosen as the smallest change in phase from the previous to the present absolute-amplitude/absolute-phase states to be transmitted, as depicted in box 24. The integral divisor is some value $360/N_p$, where $N_p$ is the number of possible absolute phase states. Next, possible valid differential phases for the differential pseudo-constellation are chosen, each being an integral multiple of $360/N_p$, as depicted in box 26. All points $i*360/N_p$, where $i=0, 1, 2, \ldots N_p-1$, do not necessarily have to be included in the differential pseudo-constellation, although they normally would be. Lastly, for each of these differential phases, there are selected one or more absolute amplitude levels depending on the differential pseudo-constellation desired, as depicted in box 28. Assuming that a total of $N_a$ amplitude levels are used, the absolute constellation will need $N_a*N_p$ points in order to generate all of the points in the differential pseudo-constellation. The differential pseudo-constellation does not necessarily have to be polar or even symmetric, although normally it would be.

For example, in a two amplitude level, polar, sixteen QAM differential pseudo-constellation there can be sixteen evenly-spaced differential phase values, separated by 22.5° increments, alternating between two absolute amplitude level values. Each differential pseudo-constellation point then has a unique phase, and each point on a given amplitude level is separated from the other nearest points on the same amplitude level by 45°. The optimal ratio of inner to outer amplitude levels to minimize BER is 0.620. An absolute constellation having thirty-two points is needed to generate these sixteen differential pseudo-constellation points.

Amplitude Scaling Using Amplitude Transitions.

The method also includes an amplitude scaling technique using amplitude transitions for scaling the amplitudes of the differential pseudo-constellation, thereby advantageously compensating for changes in signal strength. The technique is accomplished as follows, after completion of I and Q baseband sampling, with there being one sample, consisting of a sampled I value and a sampled Q value, occurring per symbol period.

Figure 2:
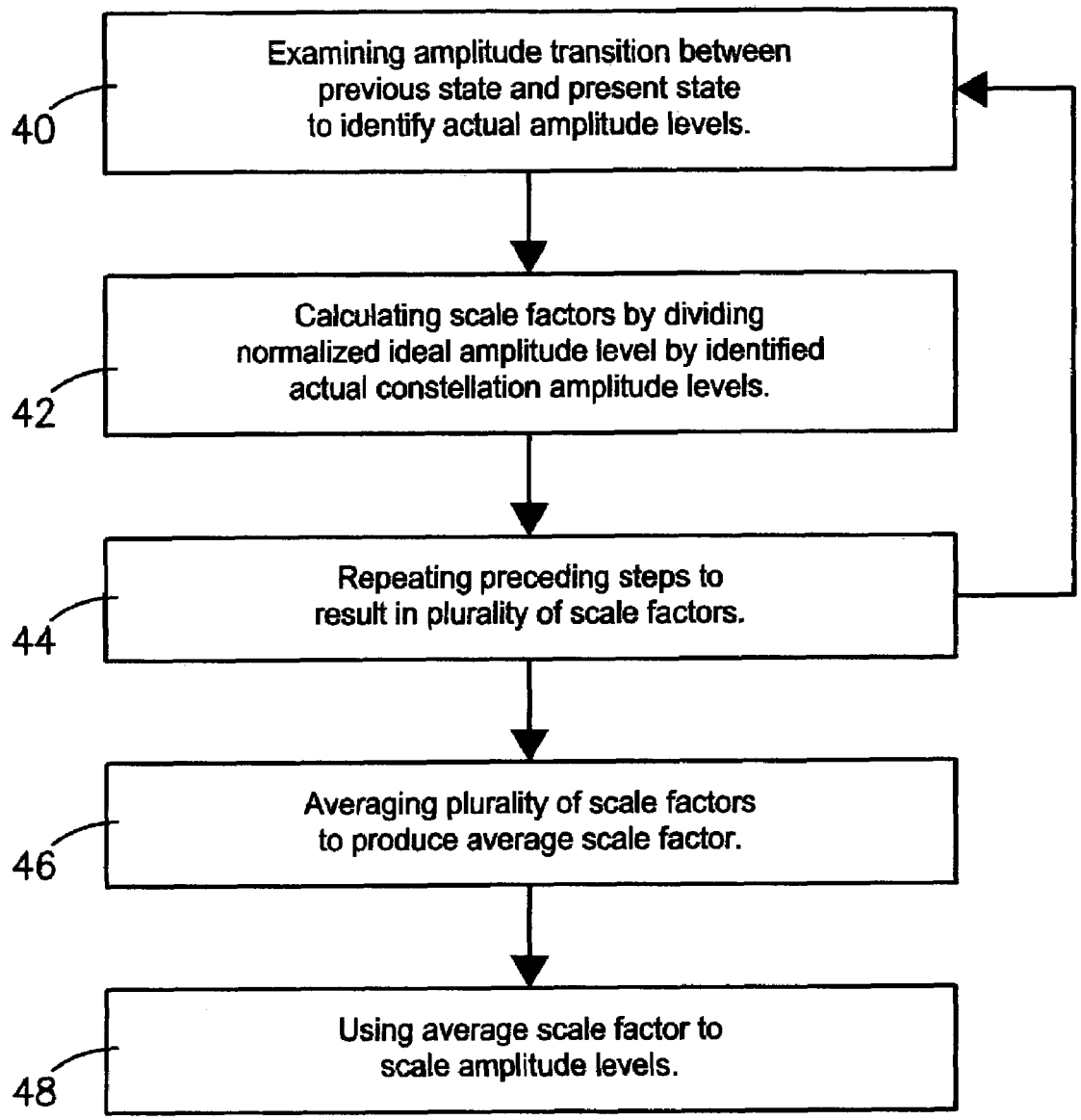
FIG. 2 is a block diagram of steps involved in a preferred embodiment of the method concerning a technique for amplitude scaling based upon amplitude transitions.

First, referring to FIG. 2, an amplitude transition, whether higher-to-lower or lower-to-higher, between a previous state and a present state is examined to identify an actual amplitude level, as depicted in box 40. Then, a scale factor is calculated by dividing a normalized ideal amplitude level by the actual constellation amplitude level, as depicted in box 42. The preceding steps are repeated to result in a plurality of scale factors, as depicted in box 44. Next, the plurality of scale factors are averaged to produce an average scale factor, as depicted in box 46. Lastly, the average scale factor is used to scale the amplitude levels, as depicted in box 48.

Figure 3:
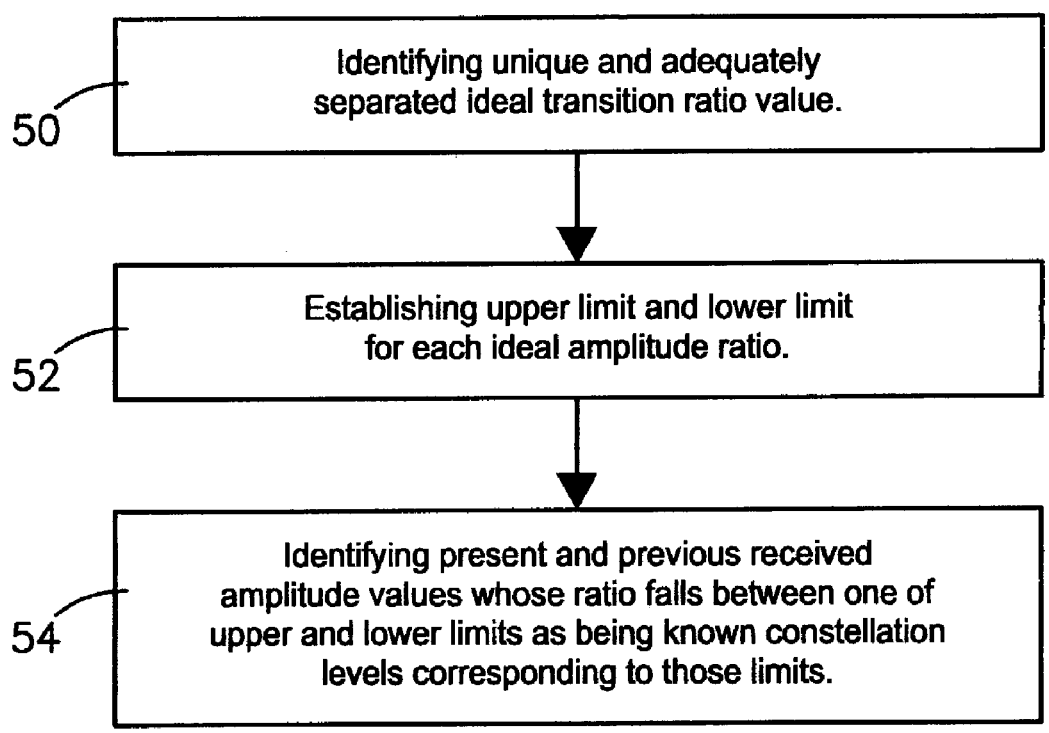
FIG. 3 is a block diagram of steps involved in accomplishing a particular step of the technique of FIG. 2, wherein the step concerns amplitude scaling.

In more detail, it will be appreciated that for N amplitude levels, there are $N*(N-1)/2$ distinct combinations of amplitude levels between which a transition can occur. Because the transition can occur in either direction, there are as many as $N*(N-1)$ possible ratios of present amplitude value to previous amplitude value. For two amplitude levels, for example, there are two amplitude transition possibilities and therefore two possible ratios of present amplitude to previous amplitude. For three amplitude levels there are six possible ratios of present amplitude to previous amplitude; for four levels there are twelve possibilities, and for five levels there are twenty possibilities. Not all of these ratio values are necessarily distinct; there could be two or more transitions for which the ratios of present amplitude to previous amplitude are equal or too close in value. Thus, referring to FIG. 3, when examining the amplitude transitions, the subset of potential transitions should be selected that results in ratio values that are unique and adequately separated from any other transition ratio value, as depicted in box 50. Then, upper and lower limits are established for each of these unique amplitude ratio values, as depicted in box 52. When the ratio of the present amplitude level to the previous amplitude level is within these limits, it is assumed that the corresponding amplitude transition has occurred, as depicted in box 54. In this way, received amplitude values for known constellation amplitude levels can be identified and used for scaling the sampled signal.

The scale factor is calculated as the ratio of the normalized ideal amplitude level to the actual constellation amplitude level. For example, if M2 and M1 represent, respectively, the present and previous absolute state sampled amplitude levels, and M2/M1 is within some tolerance of some normalized ideal ratio of amplitude levels (e.g., A2/A1+/−tolerance, where A2 and A1 are two normalized ideal amplitude levels of the constellation) then there are two estimates of the scale factor: A2/M2 and A1/M1. Either one or the other or both could be included in a running average of the scale factor for scaling the signal.

The plurality of scale factors resulting from multiple iterations of these steps are then averaged to produce an average scale factor which is thereafter used to scale the amplitude levels. The scale factor used for a given sampled amplitude value can be based on all data received or on data received only over a limited window, and it could be a weighted average with heavier weighting given to those estimates determined closest to the amplitude value being scaled.

For example, for two amplitude levels with only outer circle amplitude estimates used, continuous amplitude referencing is accomplished by identifying higher-to-lower and lower-to-higher amplitude transitions that fall within certain predetermined ratio limits. A running cumulative average of the higher amplitude values of the identified transitions is then used to determine a scale factor to scale all the absolute amplitude levels appropriately. Alternatively, the lower amplitude values could be utilized by taking each measured amplitude level, dividing the corresponding nominal amplitude value by the measured value to determine a scale factor value, and including each of these scale factor values in a running cumulative average scale factor used to scale all absolute amplitude levels.

Amplitude Scale Tracking Using Amplitude Transitions.

The method also includes an amplitude scale tracking technique for tracking-out rapid and severe scale variations in the received multiple amplitude level QAM signal, thereby advantageously facilitating successful signal demodulation and data retrieval. The technique is accomplished as follows, after completion of I and Q baseband sampling, with there being one sample, consisting of a sampled I value and a sampled Q value, occurring per symbol period.

Broadly, scaling for tracking-out the scale variations is determined based upon legitimate higher-to-lower or lower-to-higher transitions in the signal to identify known amplitude levels. Those transitions whose ratio is within a pre-established tolerance of a nominal ratio of a pair of amplitude levels, the transition between which is being searched, are considered to be known transitions between those amplitude levels, and therefore known sample amplitude levels can be identified and used for scaling the received sampled signal to the desired nominal scale. Each signal sample amplitude can be scaled based upon the closest 2*n known sample amplitudes previously identified (the closest n before and n after) and this windowed scaling can be further weighted with greater weight being given to more recent values of known sample amplitudes identified within the window. This windowed/weighted average is used to determine the scaling value to compensate for changes in signal strength. If there were no amplitude variations, then 2*n could encompass the entire sampled waveform and the same scale value would be used for all samples.

Figure 4:
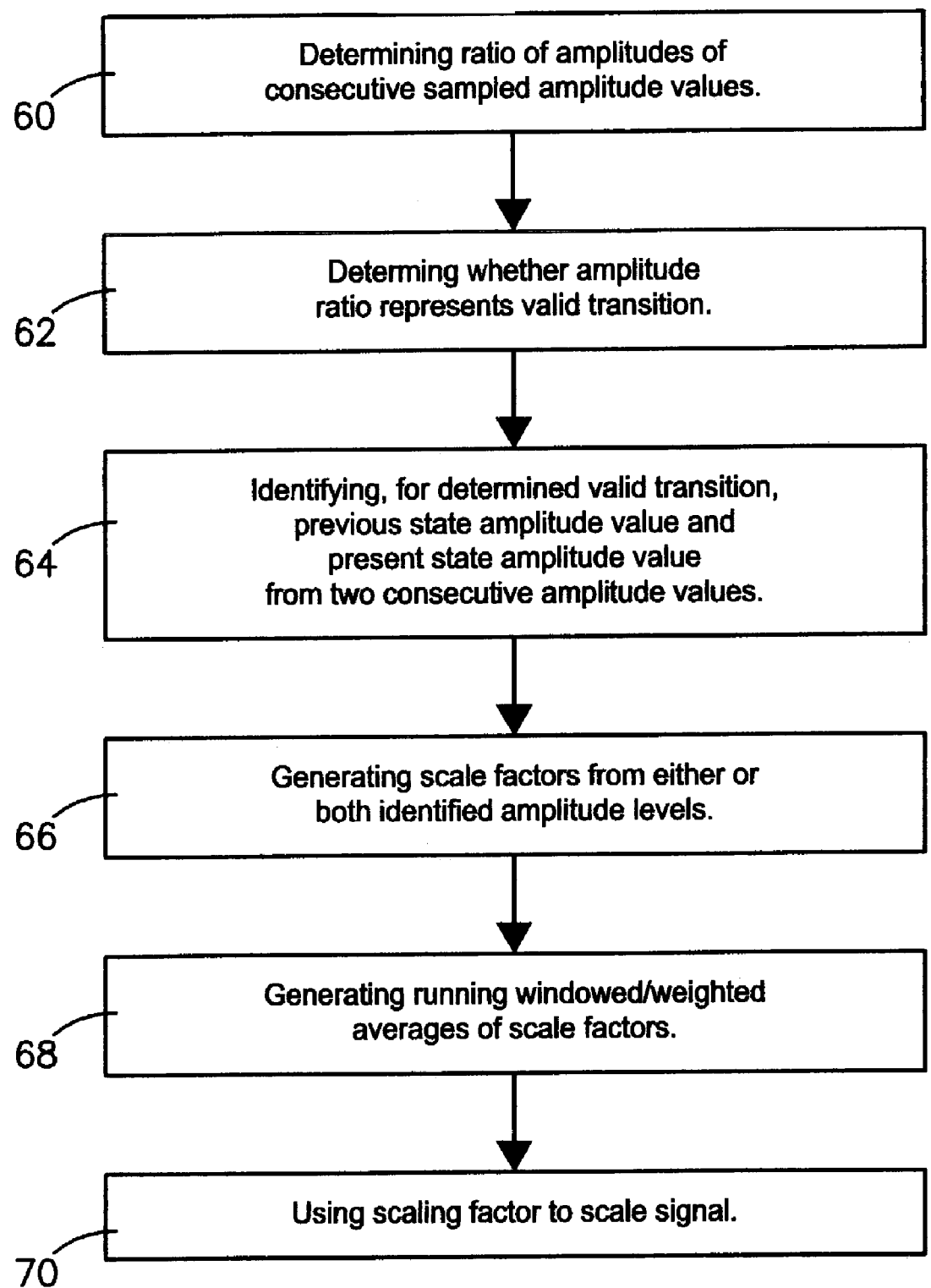
FIG. 4 is a block diagram of steps involved in a preferred embodiment of the method concerning a technique for amplitude scale tracking.

In more detail, referring to FIG. 4, for the general case of a multiple amplitude level constellation, a ratio of amplitudes of consecutive sampled amplitude values is determined, as depicted in box 60. Then it must be determined whether the amplitude ratio represents a valid transition, as depicted in box 62. For example, if the ratio is within $r+/-t_1$ or possibly also $(1/r)+/-t_2$, where r is the nominal ratio of the two consecutive constellation amplitude levels, the transition between which is being searched for scaling determination, and $t_1$ and $t_2$ are pre-established tolerances, then it is considered that this was a valid transition between those two levels. Two amplitude levels are thus identified, as depicted in box 64. From either or both of these amplitude levels, scale factors are determined as the ratio of the respective normalized ideal amplitude level to the actual amplitude level received, as depicted in box 66. For example, if M2 and M1 represent, respectively, the present and previous absolute state sampled amplitude levels received, and A2 and A1 are the respective normalized ideal amplitude levels identified, then the two estimates of scale factor are (A2/M2) and (A1/M1).

Then, windowed/weighted averages of scale factors are generated, as depicted in box 68. For each pair of sampled I and Q values to be scaled, their corresponding windowed/weighted average scale factor has put more weight on scale factors determined from closer identified amplitude levels. Lastly, the signal's I and Q values are multiplied by the corresponding windowed/weighted average of scale factors, as depicted in box 70, to compensate for any changes in signal strength.

The scaling method may be implemented as follows.

With
   Symb(0,1, . . . Size−1)=input symbol magnitude sample array;

and with
   s(0,1, . . . M)=determined scale factor values,
   p(0,1, . . . M) index position of input symbol array element Symb(*) at which scale factor s(*) (of the same index position as the corresponding p(*) element) was determined;

and with
   as(j)=AVG(from i=j to i=j+n−1) of s(i),
   where as(j) determined for j=0 to j+n−1=M (max array element number of s(i)); that is, from j=0 to j=M−n+1,
   n=even number=number of elements used in each scaling average (window) (the user would input n/2 in this case);

and with
   fas(k)=final scale factor array, each fas(k) element is used to scale the corresponding element of Symb(k) of same index.

Where the lower and upper index ranges of each fas(k) is assigned the indicated value of the as(*) element as follows:

```
fas(k) = as(0), for 0                ≦ k <    p(n/2)  ≪start at 0
fas(k) = as(1), for p(n/2)           ≦ k <    p(1 + n/2)
. . .
fas(k) = as(j − 1),                  ≦ k <    p(j + n/2 − 1)
   for p(j + n/2 − 2)
fas(k) = as(j),                      ≦ k <    p(j + n/2)  ≪general formula
   for p(j + n /2 − 1)
fas(k) = as(j + 1),                  ≦ k <    p(j + n/2 + 1)
   for p(j + n/2)
. . .
fas(k) = as(M − n),                  ≦ k <    p(M − n/2)
   for p(M − n/2 − 1)
fas(k) = as(M − n + 1),              ≦ k ≦    Size − 1  ≪end at Size − 1
   for p(M − n/2)
```

Notes:
Lowest as(*) index = 0
Max as(*) index = M − n + 1

The index of the p(*) value corresponding to the last lower index range for fas(*) element value assignment can be verified as: Last j value=M−n+1. That is, last j value=last as(*) index, because, per the general formula, as(*) index=j. The general formula has index of p(*) element corresponding to lower index range of fas(*) element value assignment=j+n/2−1. Substituting "j+n/2−1" from the general formula and the last j value for j, the index of p(*) corresponding to the last lower index range for fas(*) element value assignment is M−n/2.

Then, using the values set forth above, the new scaled magnitude for each $k^{th}$ symbol becomes fas(k)*Symb(k).

Amplitude Scaling Using Amplitude Maximums.

The method also includes an alternative amplitude scaling technique using amplitude maximums. This technique is performed as follows after downconverting to baseband, filtering, and symbol sampling.

Figure 5:
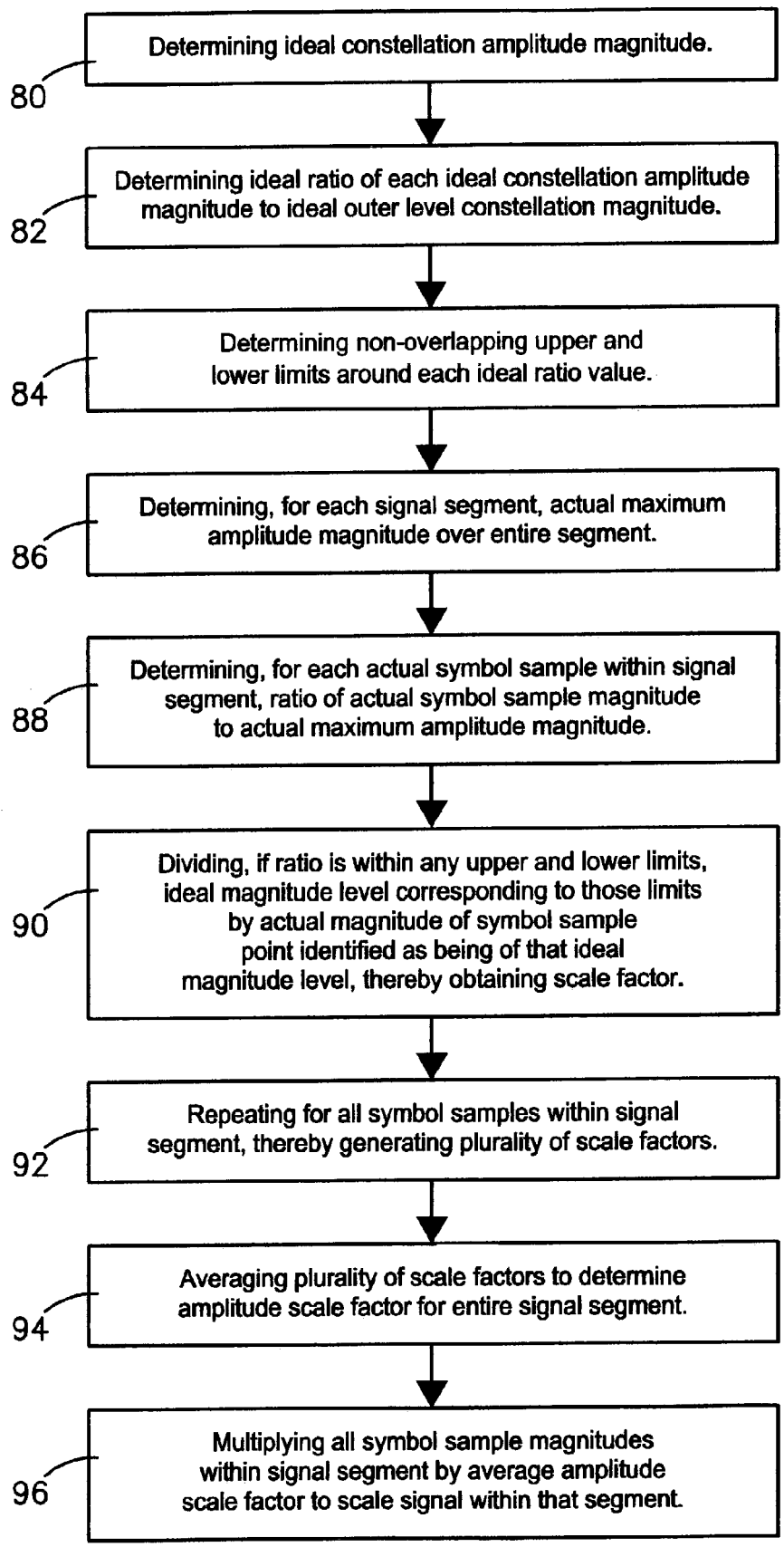
FIG. 5 is a block diagram of steps involved in a preferred embodiment of the method concerning a technique for amplitude scaling.

Step 1. Referring to FIG. 5, ideal constellation amplitude magnitudes are first determined, as depicted in box 80. Then, an ideal ratio of each ideal constellation amplitude magnitude to the outer level constellation magnitude is determined, as depicted in box 82. Then upper and lower limits are determined around the ideal ratio value, as depicted in box 84. These limits are set so as not to overlap the limits around the ideal ratio value corresponding to any other magnitude level, and will therefore uniquely identify a given amplitude ratio within a given set of limits with the ideal constellation amplitude level corresponding to those limits.

Step 2. For a given signal segment to be scaled, the maximum amplitude magnitude over the entire segment is determined, as depicted in box 86. This is assumed to be the outer level constellation magnitude.

Step 3. For each symbol sample, the ratio of the symbol sample magnitude to the maximum magnitude determined in Step 2, above, over the entire segment is determined, as depicted in box 88. If this ratio is within the upper and lower limits determined in Step 1, above, corresponding to a given ideal magnitude level, then that point can be identified as being of that ideal magnitude level. That ideal magnitude level is then divided by the magnitude of that symbol sample point identified as being of that ideal magnitude level to obtain a scale factor, as depicted in box 90.

Step 4. Step 3 is repeated for all symbol samples within the signal segment, thereby generating a plurality of scale factors, as depicted in box 92. The plurality of scale factors are then averaged and used to determine an amplitude scale factor for the entire signal segment, as depicted in box 94.

Step 5. All symbol sample magnitudes within the signal segment are multiplied by the average amplitude scale factor, as depicted in box 96, to compensate for any changes in the strength of the signal.

$2^N$ Power Carrier Recovery.

The method also includes a $2^N$ power carrier recovery technique for recovering a carrier signal from the QAM signal alone and without benefit of a pilot carrier wave, thereby advantageously facilitating demodulation of the QAM signal and retrieval of the data.

Figure 6:
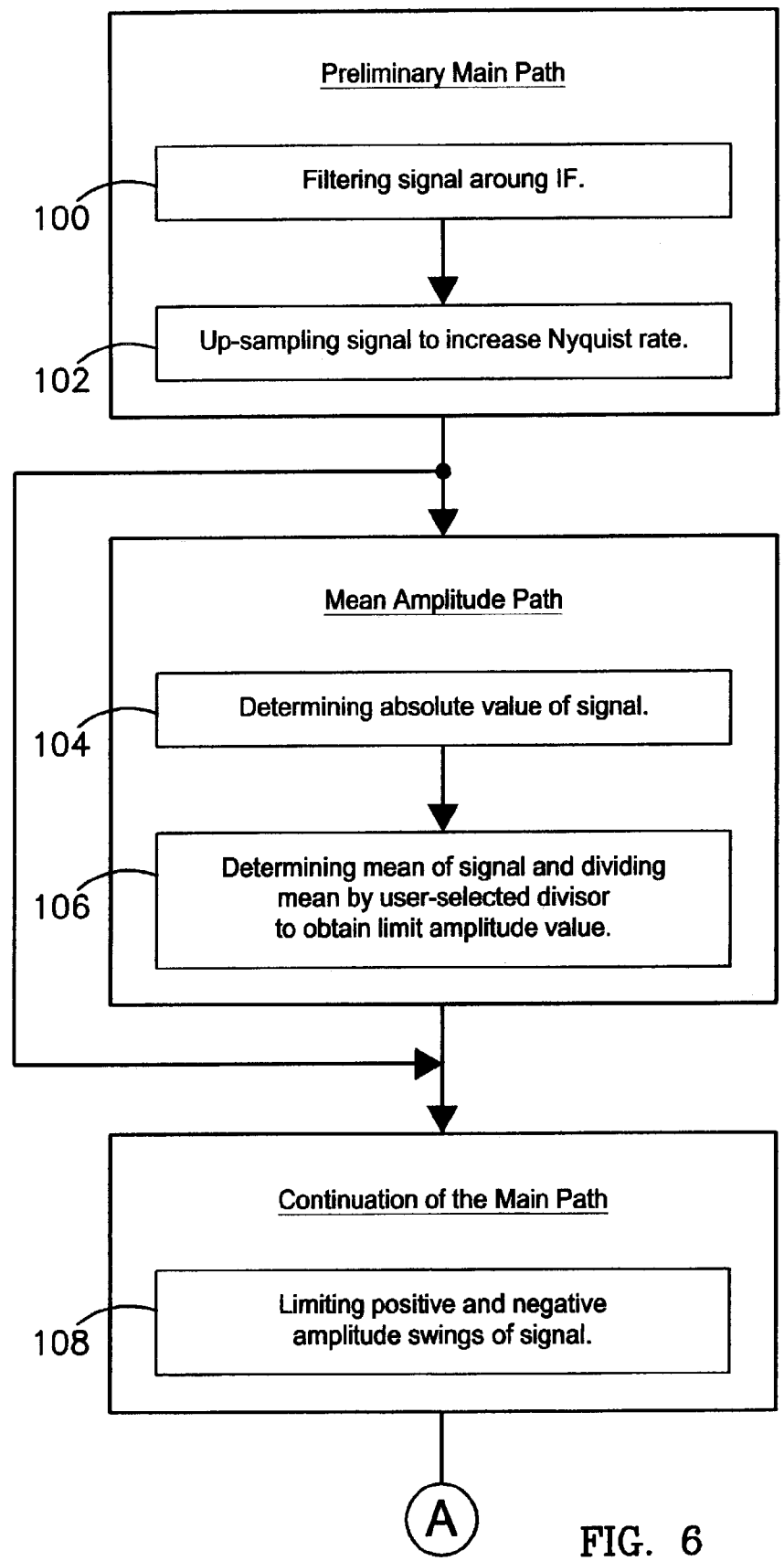
FIG. 6 is a block diagram of steps involved in a preferred embodiment of the method concerning a technique for $2^N$ power carrier recovery of a modulated signal.
Figure 7:
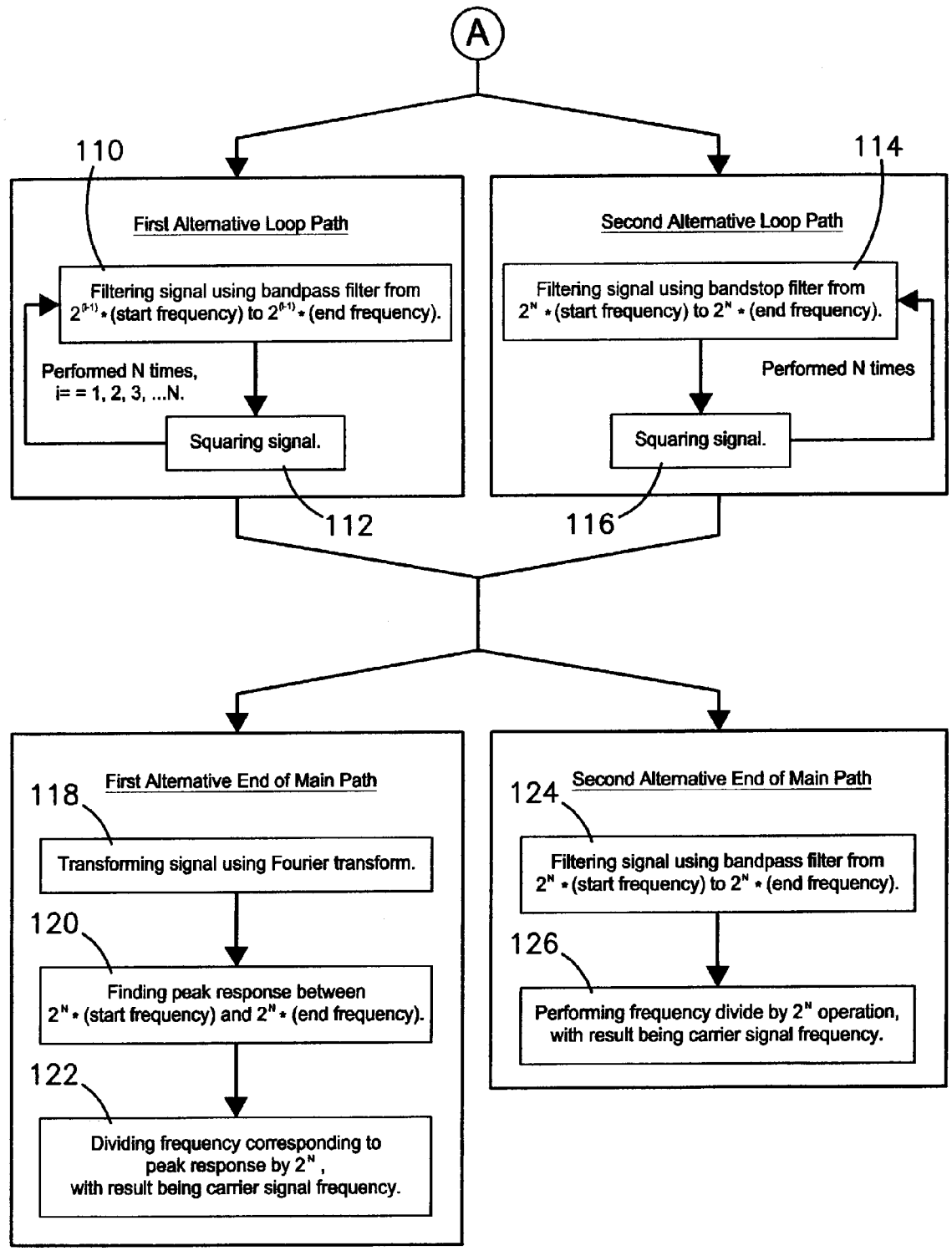
FIG. 7 is a continuation of the steps shown in FIG. 6.

The technique is as follows. Referring to FIGS. 6 and 7, on a Preliminary Main Path, given a QAM signal having $2^N$ phase states, the signal is first bandpass pre-filtered around an intermediate frequency (IF), e.g., +/−1/(symbol period), as depicted in box 100. The IF is the center frequency of the (possibly digitized) starting input signal being processed. Then, if the system is implemented digitally, the signal is up-sampled, as depicted in box 102, to increase the Nyquist rate (sample frequency/2) of the starting input sample, prior to any signal squaring, sufficiently above the highest signal frequency component that there will be after the signal has been raised to the $2^N$ power ([sample frequency/2]>p*[IF+(BW/2)]*$2^N$, where BW=signal bandwidth, and p>1, e.g., p=3). Thus, up-sampling in the present invention normally results in an increase in the sample rate of the starting input signal by a factor of $2^N$. The Preliminary Main Path continues below on a Continuation of the Main Path.

On a Mean Amplitude Path, the absolute value of the signal is determined, as depicted in box 104. Then, the mean is determined and divided by a user-selected divisor, as depicted in box 106, to obtain a limit amplitude value which is near the lowest constellation amplitude level. The Mean Amplitude Path can be performed following or substantially simultaneous with the Preliminary Main Path.

On a Continuation of the Main Path, the signal's positive and negative amplitude swings are either hard or soft limited to the limit amplitude value determined on the Mean Amplitude Path, as depicted in box 108. Hard limiting involves simply clipping the signal amplitude; soft limiting involves applying a more gradual compression curve to the signal amplitude.

Two alternative loop paths are then available. On a First Alternative Loop Path (repeated N times, for i=1, 2, 3, . . . N), the signal is bandpass filtered from $2^{(i-1)}$*(start frequency) to $2^{(i-1)}$*(end frequency), as depicted in box 110, and then squared, as depicted in box 112.

On a Second Alternative Loop Path (repeated N times), the signal is bandstop filtered from $2^N$*(start frequency) to $2^N$*(end frequency), as depicted in box 114, and then squared, as depicted in box 116.

Two alternative end paths are then available. On a First Alternative End of Main Path, the signal is Fourier transformed (e.g. FFT), as depicted in box 118. Then the peak response is found between $2^N$*(start frequency) and $2^N$*(end frequency), as determined in box 120. Lastly, the frequency corresponding to the peak response is divided by $2^N$, as depicted in box 122, with the result being the carrier signal frequency.

On a Second Alternative End of Main Path, the signal is bandpass filtered from $2^N$*(start frequency) to $2^N$*(end frequency), as depicted in box 124. Lastly, a frequency divide by $2^N$ operation is performed, as depicted in box 126, with the result being the carrier signal frequency.

For example, for a QAM signal having sixteen phase states ($2^4$), the $2^N$ power carrier recovery technique proceeds as follows. On the Preliminary Main Path, the original input signal is first bandpass pre-filtered around the IF. Then the signal is up-sampled to increase the Nyquist rate, as discussed above. This results in an increase in the sample rate of the starting input signal by a factor of sixteen. As above, the Preliminary Main Path continues below on the Continuation of the Main Path.

On the Mean Amplitude Path, the absolute value of the original input signal is determined. Then, the mean is determined and divided by the user-selected divisor to obtain the limit amplitude value which is near the lowest constellation amplitude level.

On the Continuation of the Main Path, the signal's positive and negative amplitude swings are either hard or soft limited to the limit amplitude value determined on the Mean Amplitude Path.

On the First Alternative Loop Path (repeated four times, for i=1, 2, 3, 4), if used, the signal is bandpass filtered from $2^{(i-1)}$*(start frequency) to $2^{(i-1)}$*(end frequency), and then squared.

On the Second Alternative Loop Path (repeated four times), if used, the signal is bandstop filtered from 16*(start frequency) to 16*(end frequency), and then squared.

On the First Alternative End of Main Path, if used, the signal is Fourier transformed (e.g. FFT). Then the peak response is found between 16*(start frequency) and 16*(end frequency). Lastly, the frequency corresponding to the peak response is divided by 16.

On the Second Alternative End of Main Path, if used, the signal is bandpass filtered from 16*(start frequency) to 16*(end frequency). Lastly, a frequency divide by 16 operation is performed.

Thus, the carrier signal can be recovered either from the pilot carrier wave, if available, or from the modulated signal itself using the present method, and thereafter used to demodulate the absolute IQ points with unknown phase shift.

Coherent Demodulation.

The method also includes an improved coherent demodulation "N+" window technique for carrier recovery that advantageously provides significant improvement in BER versus Eb/No over incoherent demodulation.

Figure 8:
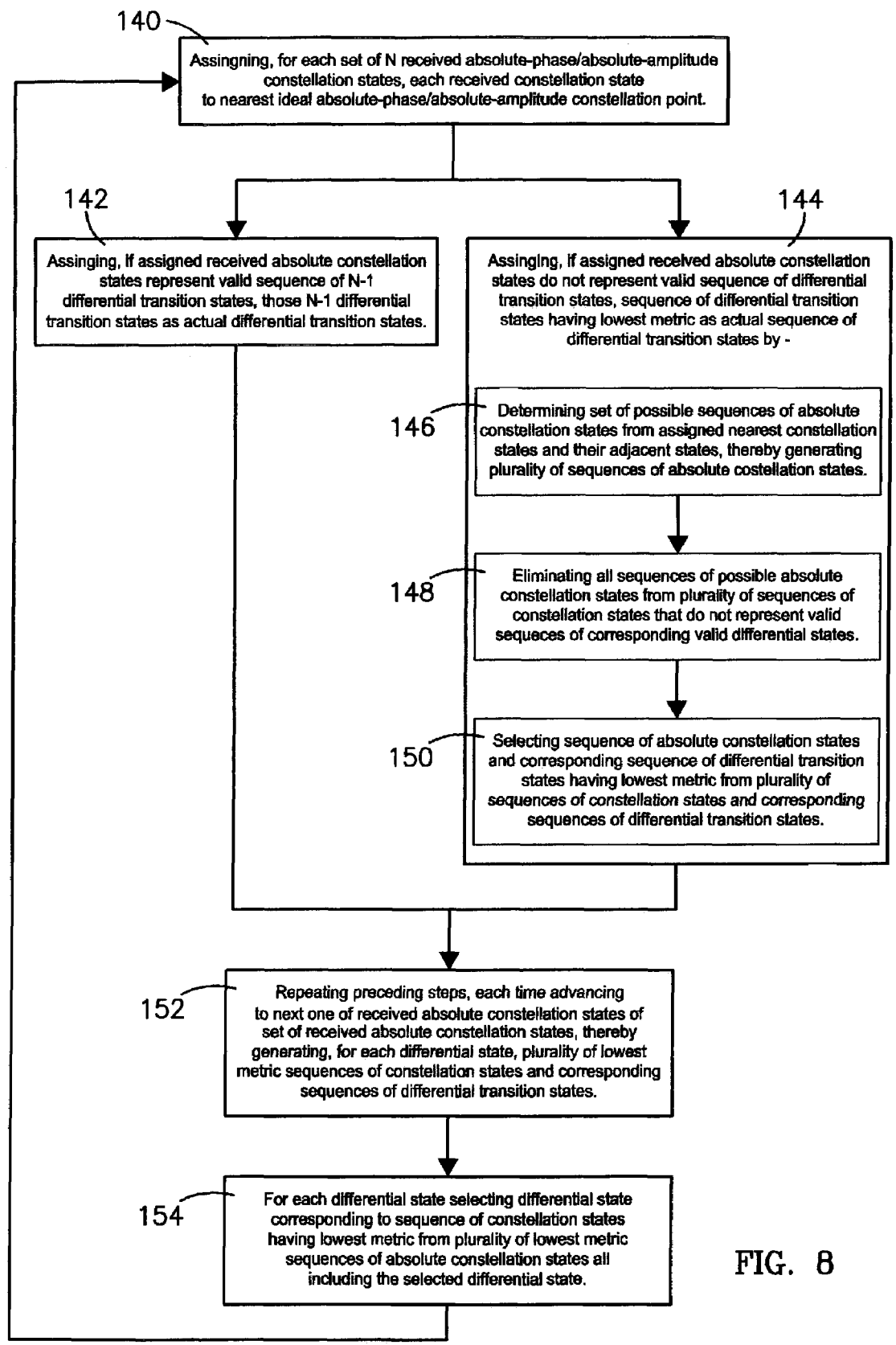
FIG. 8 is a block diagram of steps involved in a preferred embodiment of the method concerning a technique for coherent demodulation for coherently recovering the carrier signal.

The technique is as follows. Referring to FIG. 8, for each set of N absolute-phase/absolute-amplitude constellation received states, each state is assigned to the nearest ideal absolute-phase/absolute-amplitude constellation point, as depicted in box 140. If these represent a legal sequence of N−1 differential transition states, then those are the N−1 differential transition states tentatively assigned, as depicted in box 142. Otherwise, the N−1 differential transition states tentatively assigned will be based upon a sequence of lowest metric constellation states determined as follows, as depicted in box 144. For each of the N absolute-phase/absolute-amplitude constellation states, it and the M adjacent states, for M+1 total states, are determined, as depicted in box 146. This results in $(M+1)^N$ possible combinations. These are then reduced to only those combinations that represent a sequence of N−1 valid differential transitions, as depicted in box 148. Of these, the one with the lowest metric (for example, sum of squares of N distances between ideal absolute constellation positions and received positions) is tentatively chosen as the N−1 differential transition states or N absolute states, as depicted in box 150. The previous steps are then repeated each time advancing one state at a time through the received sequence, as depicted in box 152, such that each differential transition is assigned with associated metric N−1 times. Lastly, the metric is again applied and the one of the N−1 with the smallest associated metric is chosen as the actual differential state, as depicted in box 154, hence the "+" in N+, effectively increasing the window beyond the N but in a weaker form.

For example, coherent demodulation for N=4, applied to a thirty-two state, two amplitude level, polar, absolute constellation with, on each amplitude level, sixteen evenly divided phases at values i*22.5°, where i=0 to 15, is accomplished as follows. First, for each set of four absolute-phase/absolute-amplitude constellation received states, each of the states is assigned to the nearest ideal absolute-phase/absolute-amplitude constellation point. If these represent a valid sequence of three differential transition states, then they are the three differential transition states assigned. Otherwise, for each of the four absolute states, it and the five adjacent states, for a total of six states, are determined. This results in 6*6*6*6=1296 possible combinations. These are then reduced to only those combinations that represent a sequence of three valid differential transition states. Of these, the one with the lowest metric is chosen as the three differential transition states or four absolute states. The preceding steps are repeated, each time advancing to the next state in the received sequence, such that each differential transition is assigned three times. Once again the metric is applied and the one of the three with the smallest metric is chosen as the actual differential transition state, hence the "+" in 4+, effectively increasing the window beyond the 4 but in a weaker form.

Incoherent Demodulation.

The method also includes an incoherent demodulation technique using "closest to" state assignment to advantageously accomplish carrier recovery when coherent carrier recovery is not possible or practical due to signal degradation.

Figure 9:
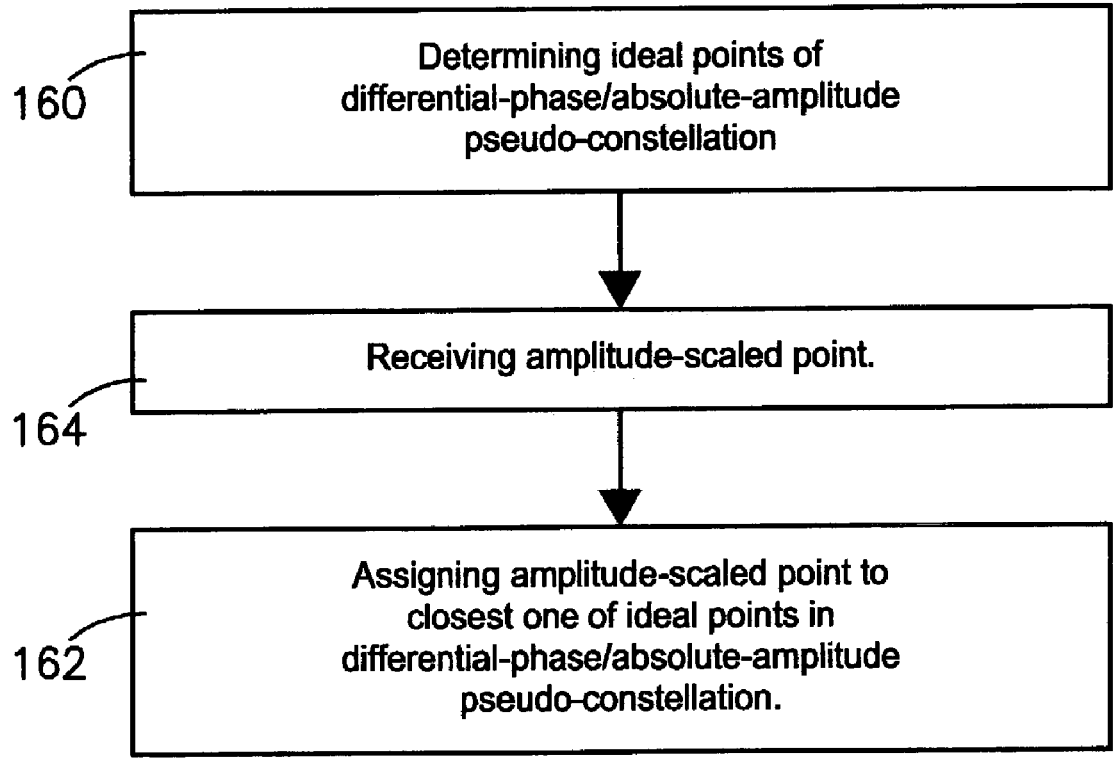
FIG. 9 is a block diagram of steps involved in a preferred embodiment of the method concerning a technique for incoherent demodulation for incoherently recovering the carrier signal.

The technique, wherein each actual differential-phase/absolute-amplitude pseudo-constellation normalized point received (after amplitude scaling, described above) is assigned to the closest ideal differential-phase/absolute-amplitude state in the differential pseudo-constellation, is as follows. Referring to FIG. 9, the ideal points in the multi-state differential pseudo-constellation must first be determined, as depicted in box 160. Thereafter, when a normalized point is received, as depicted in box 162, it is assigned, as depicted in box 164, to a closest one of the ideal points.

Thus, the carrier signal can be recovered incoherently either from a pilot signal or from the modulated signal itself and used to demodulate the absolute IQ points with unknown phase shift. The differential phases are then calculated from this sequence to determine the differential phase and absolute amplitude IQ sequence.

Furthermore, because, for incoherent demodulation, only phase need be differential while amplitude can be scaled based upon amplitude transitions, BER is minimized. Thus, BER is not sacrificed any more than necessary to achieve the robustness and important attributes of incoherent demodulation and relative referencing.

Transmitter Logic.

One possible transmitter logic for generating the desired differential-phase/absolute-amplitude symbols from the tuned absolute-phase/absolute-amplitude IQ constellation points is as follows. The transmitter logic can be implemented in any suitable software, firmware, or hardware embodiment, such as, for example, a Xilinx FPGA.

Figure 10:
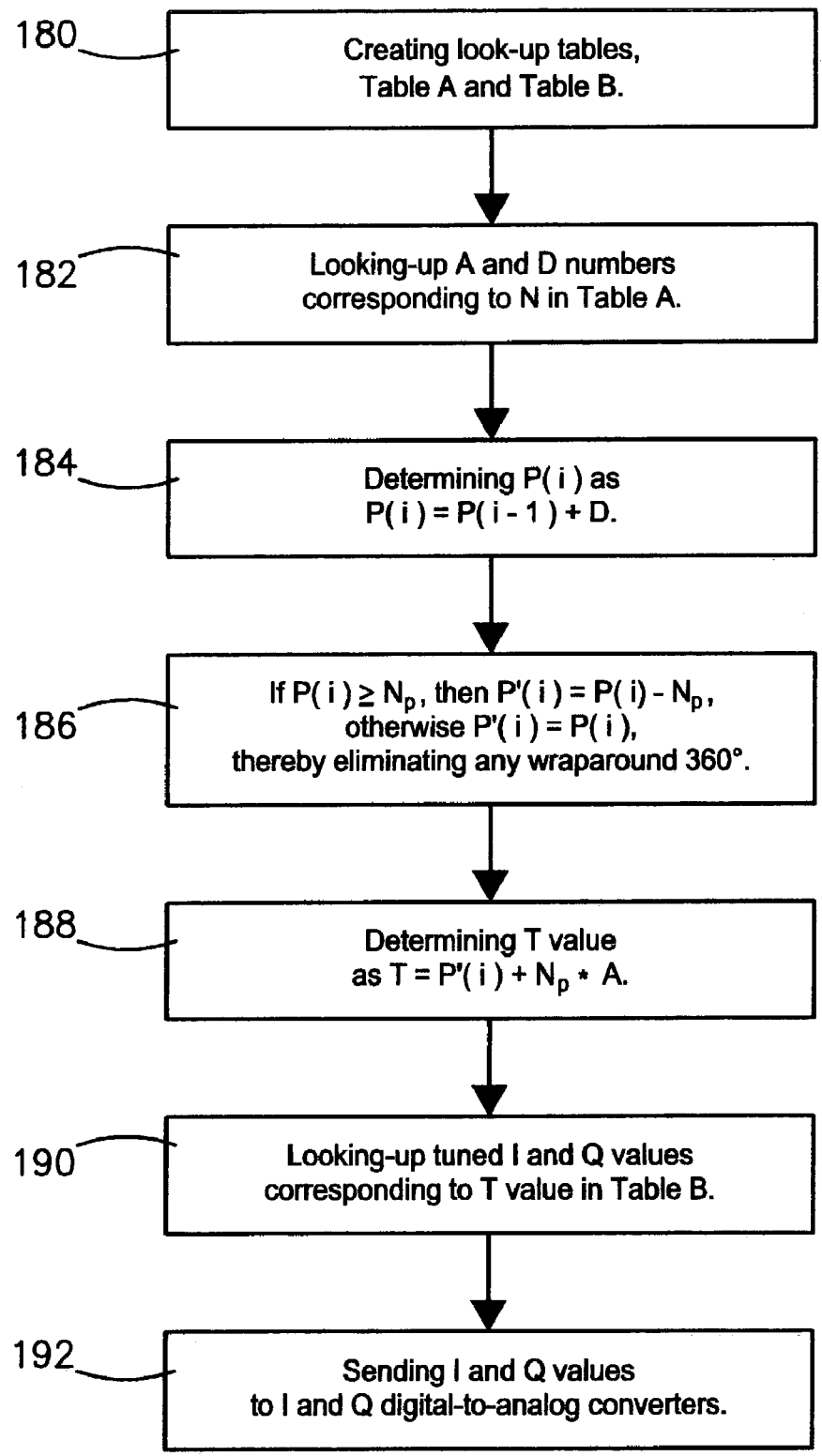
FIG. 10 is a block diagram of steps involved in a preferred embodiment of transmitter logic for implementing a portion of the method of the present invention.

Step 1. First, referring to FIG. 10, two look-up tables, Table A and Table B, are created, as depicted in box 180. Exemplary tables are shown below. In Table A is a list of all the states in the differential pseudo-constellation, N=0 to C, where C=the total number of differential pseudo-constellation points−1, and where N=the number being transmitted with that symbol. Thus, for example, C=15 for a 16 symbol differential pseudo-constellation, and N=9=1001 for a 16 symbol differential pseudo-constellation. Corresponding to each element N are two representative integer numbers: a first number and a second number. The first number, A, represents the corresponding amplitude level, 0,1, . . . (total number of amplitude levels)−1. Thus, for example, for two amplitude levels, A=0 and 1. The second number, D, represents the phase expressed as the number of differential phase increments to be sent. The phase increment is the smallest change in phase from one absolute-phase/absolute-amplitude state to the next, an integral divisor of 360°, $360/N_p$, where $N_p$=total number of absolute-phase/absolute-amplitude phases. So the total phase shift corresponding to a given value of D is $D*(360/N_p)$ degrees. Normally, the A and D values will map a Gray or near-Gray coded constellation. In Table B, a list of absolute-phase/absolute-amplitude tuned I and tuned Q values are given along with a corresponding index position number, T.

Step 2. When it is desired to transmit the bit pattern (binary) equal to the number N (decimal), the A and D numbers corresponding to N are looked-up in Table A, as depicted in box 182. Then an absolute phase, P(i), is determined, as depicted in box 184. Specifically, if the number P represents the absolute phase, in terms of the number of phase increments, corresponding to the new absolute-phase/absolute-amplitude state to be transmitted, then P(i)=P(i−1)+D. Where P(i)=absolute phase, in number of phase increments, to be transmitted and P(i−1)=absolute phase, in number of phase increments, previously transmitted, that is, the previous P'(i) value. The absolute phase corresponding to a given value of P is $P*(360/N_p)$ degrees.

Step 3. If P(i)>=$N_p$, then the revised P(i) value, P'(i), becomes P'(i)=P(i)−$N_p$. Otherwise P'(i)=P(i). Thus, P'(i) <$N_p$. This eliminates any wrap-around 360°, as depicted in box 186.

Step 4. Next, a T value is determined as T=P'(i)+$N_p$*A, as depicted in box 188.

Step 5. Then, tuned I and tuned Q values corresponding to the T value determined in Step 4 are looked-up in Table B, as depicted in box 190, and then sent to the I and Q digital-to-analog converters, as depicted in box 192. These values may be tuned to correct for any hardware errors so that they correspond to the correct IQ constellation points, as depicted in box 194.

Applying this general procedure specifically to a differential-phase/absolute-amplitude polar constellation with two amplitude levels and sixteen states, each with a distinct phase and alternating amplitude levels, the transmitter logic for transforming the desired QAM differential phase and absolute amplitude symbol number into the required tuned absolute IQ values to generate the corresponding differential phase and absolute amplitude is as follows. The following detailed definitions apply:

N is the desired differential phase and absolute amplitude QAM position number to be transmitted; N is equal to the actual 4 bits to be transmitted, 0 (0000) through 15 (1111).

A is the amplitude level, 0 or 1, where 0 represents inner amplitude and 1 represents outer amplitude.

D is the differential phase number, 0 through 15, which represents a phase shift of D*22.5°. These are for semi-Gray coded symbols.

P is the absolute phase number, 0-30 before Bit 5 null and 0-15 after Bit 5 null.

T is the tuned absolute IQ constellation position number, 0-31.

TABLE A

| N | A | D |
|---|---|---|
| 0 | 0 | 1 |
| 1 | 0 | 3 |
| 2 | 0 | 7 |
| 3 | 0 | 5 |
| 4 | 0 | 15 |
| 5 | 0 | 13 |
| 6 | 0 | 9 |
| 7 | 0 | 11 |
| 8 | 1 | 0 |
| 9 | 1 | 2 |
| 10 | 1 | 6 |
| 11 | 1 | 4 |
| 12 | 1 | 14 |
| 13 | 1 | 12 |
| 14 | 1 | 8 |
| 15 | 1 | 10 |

TABLE B

| Tuned Absolute IQ Constellation Points | | |
|---|---|---|
| T | Tuned I | Tuned Q |
| 0 | . . . | . . . |
| 1 | . . . | . . . |
| . . . | . . . | . . . |
| 31 | . . . | . . . |

Step 1. Look up row N (0-15) in Table A for A & D values.

Step 2. P (0-30)=P (0-15)+D (0-15), (P=0 initially).

Step 3. Null Bit 5 of P (0-30 before, 0-15 after).

Step 4. T (0-31)=P (0-15)+16*A (0,1), (shift A 4 bits left).

Step 5. Look up row T (0-31) in Table B for new IQ absolute position, then output to I and Q digital-to-analog converters.

Method of Multipath Equalization.

The method also includes a multipath equalization technique for equalizing a frequency dependent multipath to advantageously deal with moderate and severe conditions of frequency dependent fading so that data can be successfully recovered. Use of the present multipath equalization method provides an enhanced data transmission rate with an acceptable signal-to-noise ratio.

Figure 11:
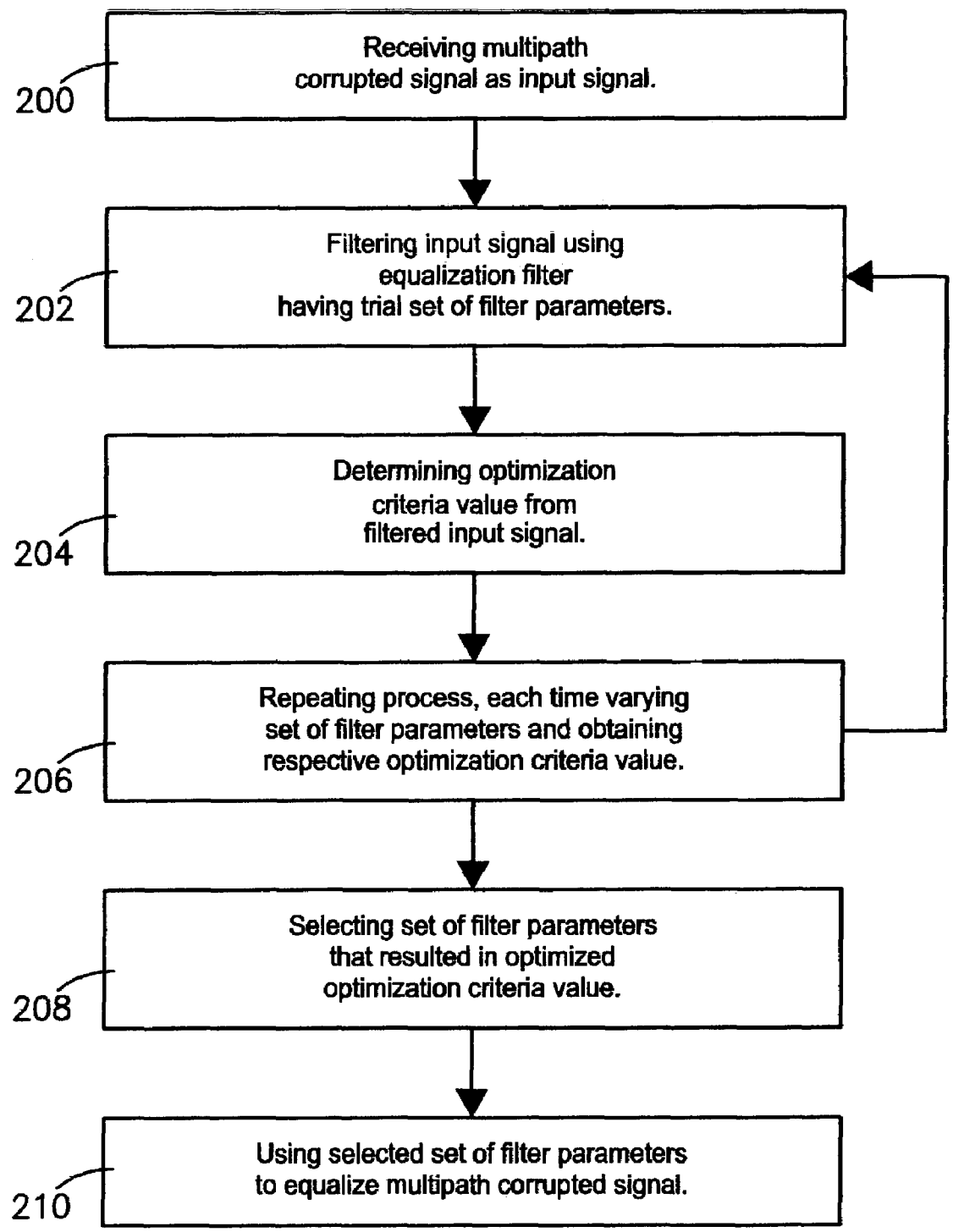
FIG. 11 is a block diagram of steps involved in a preferred embodiment of the method concerning a technique for two-ray multipath equalization.

Referring to FIG. 11, the frequency dependent multipath can be successfully equalized as follows. First, the multipath corrupted signal is received as an input signal, as depicted in box 200. Then, the input signal is filtered using an equalization filter having a set of one or more trial filter parameters, as depicted in box 202. The one or more filter parameters can include Ai's, Di's and Pi's, where i=1 to M−1 to compensate M multipath signals. Ai is the fractional amplitude of the $i^{th}$ multipath signal relative to the line-of-sight (LOS) signal. Di is the relative delay between the $i^{th}$ multipath signal and the LOS signal. Pi is the relative angle between the $i^{th}$ multipath signal and the LOS signal. The A, D, and P filter parameters are discussed in greater detail below. Next, an optimization criteria is determined from the filtered input signal, as depicted in box 204. Thereafter, the process is repeated, each time varying the set of one or more filter parameters to obtain its respective optimization criteria value, as depicted in box 206. Lastly, based on the various optimization criteria results obtained, the set of one or more filter parameters that resulted in an optimized optimization criteria value is selected, as depicted in box 208, and used to compensate the multipath corrupted signal and successfully equalize the frequency dependent multipath, as depicted in box 210.

These general steps can be used for both two-ray and M-ray signals. More specifically, in many cases the multipath corrupted signal can be modeled as comprising two rays, including a first ray that is a line-of-sight (LOS) signal and a second ray that is a second multipath signal reflected off of, for example, a water or land surface. First, the multipath corrupted signal is received as the input signal. Then, the received signal complex envelope, $s_k = I_k + jQ_k$, of the input signal is filtered using a recursive filter involving a signal delay term:

$$1/[1+Ae^{jP}z^{-(D+1)}],$$

where A is the fractional amplitude of the second multipath signal relative to the LOS signal, P is the relative angle, and D is the relative delay−1.

The filter is stable in this form as long as A<1. In the case in which A>1, the filter must be put into a causal non-recursive approximation form:

$$z^{-ND} - z^{(1-N)D}/(Ae^{jP}) + z^{(2-N)D}/(Ae^{jP})^2 - z^{(3-N)D}/(Ae^{jP})^3 + z^{(4-N)D}/(Ae^{jP})^4 \ldots (-1)^n z^{(n-N)D}/(Ae^{jP})^n \ldots (-1)^N/(Ae^{jP})^N,$$

where N=number of terms in series−1.

Note that the indices correspond to original digitized IF sample points, not symbol sample points.

Next, the optimization criteria is applied to the filtered complex envelope of the input signal and an optimization criteria value is determined. The optimization criteria used to obtain the best A, D, and P values can be to either maximize the magnitude of "correlation of correlation"; minimize "constellation spread"; or minimize 10*(number of parity errors)+(constellation spread). The definition of constellation spread is:

$$\sqrt{[\Sigma_i(L_i^2)]},$$

where $L_i^2 = (I_{Ci} - I_{Si})^2 + (Q_{Ci} - Q_{Si})^2$;

$(I_{Si}, Q_{Si})$=differential-phase/absolute-amplitude pseudo-constellation symbol sample point vector received; and $(I_{Ci}, Q_{Ci})$=ideal differential-phase/absolute-amplitude pseudo-constellation point vector closest to $(I_{Si}, Q_{Si})$.

That is, $L_i$ is the distance between the sampled differential-phase/absolute-amplitude pseudo-constellation point received and the nearest ideal differential-phase/absolute-amplitude pseudo-constellation point.

Short of performing a full demodulation, maximizing the magnitude of the correlation of correlation scalar metric works well. The correlation of correlation scalar optimization criteria is:

$$R_{ST} \cdot R_{TT}^* / \|R_{ST}\|,$$

where, $R_{ST}(k) = \Sigma_i S_{(i+k)} T_i^*$;
$R_{TT}(k) = \Sigma_i T_{(i+k)} T_i^*$;
$\|R_{ST}\| = \sqrt{(R_{ST} \cdot R_{ST}^*)}$;

"·" is the dot product with respective peaks of product terms aligned and each product term reduced to the segment just encompassing the trigger response area;

$T_k$ is the ideal complex envelope trigger sequence transmitted;

$S_k$ is the actual complex envelope trigger sequence received after trial equalization;

the indices correspond to the original digitized IF sample points (not the symbol sample points); and "trigger sequence" refers to a known set of pseudo-random symbols that are transmitted each burst, and is required by the "correlation of correlation" criteria, but not by the 10*(number of parity errors)+(constellation spread) criteria.

Alternatively, the correlation of correlation scalar optimization criteria to maximize could be:

$$\mathrm{MAX}\|\{\Sigma_i R_{ST}(i+k) R_{TT}(i)^* / \|R_{ST}\|\}\|, \text{ where, MAX is the maximum value.}$$

But note, the alternative criteria requires more mathematical operations than the criteria $R_{ST} \cdot R_{TT}^* / \|R_{ST}\|$, though the results are identical.

Lastly, based on the various optimization criteria results obtained, the set of one or more filter parameters that resulted in an optimized optimization criteria value is selected for compensating the multipath corrupted signal and successfully equalizing the frequency dependent multipath.

In some cases the multipath corrupted signal must be modeled as comprising M-rays, where M is greater than two. The aforementioned steps, described for two-ray compensation, can be adapted to equalize an M-ray multipath corrupted signal by determining the causal, stable, non-recursive filter approximation to the recursive filter with multiple sets of $A_i$, $D_i$, and $P_i$, where i=1 to M−1. The recursive filter involving M−1 delay terms is $1/[1+\Sigma_i A_i e^{jP_i} z^{-(D_i+1)}]$, where the sum is taken from i=1 to M−1. If all poles are within the unit circle, the recursive filter itself can be used.

Though not ideal, further improvement is possible by taking the signal so equalized and repeating the above-described two-ray equalization procedure. This can be done for multiple iterations, with each two-ray equalization iteration operating on the output of the previous iteration. Ideally, all filter parameters of a multiple delay term filter are determined simultaneously, though doing so may require a large number of simultaneous search parameters.

Figure 12:
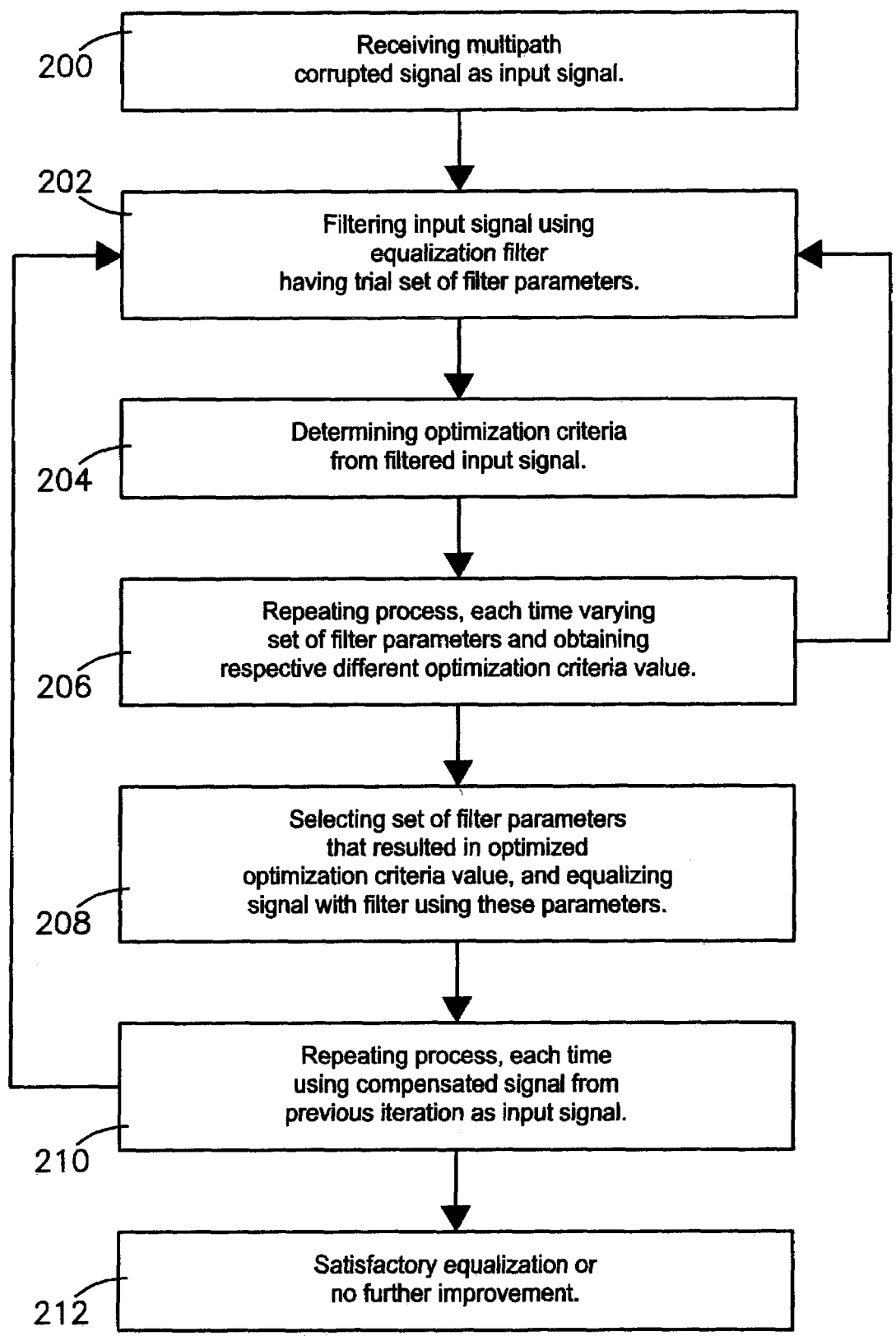
FIG. 12 is a block diagram of steps involved in a preferred embodiment of the method concerning a technique for M-ray multipath equalization.

First, referring to FIG. 12, the input signal is compensated to be equalized for two rays, using the two-ray compensation method described above. Then, the two ray compensation method is repeated N−1 times, each time using the compensated signal from the previous iteration, as depicted in box 212. This results in N sets of amplitude, $A_i$, delay, $D_i$, and phase, $P_i$, compensation values, where i=1, 2, ... N. This process is repeated until a satisfactory equalization is achieved or nor further improvement occurs, as depicted in box 214.

Demodulation Filtering.

The method also includes a demodulation filtering technique for the case in which there are transmitter baseband filters and there are no close-in interferers.

Figure 13:
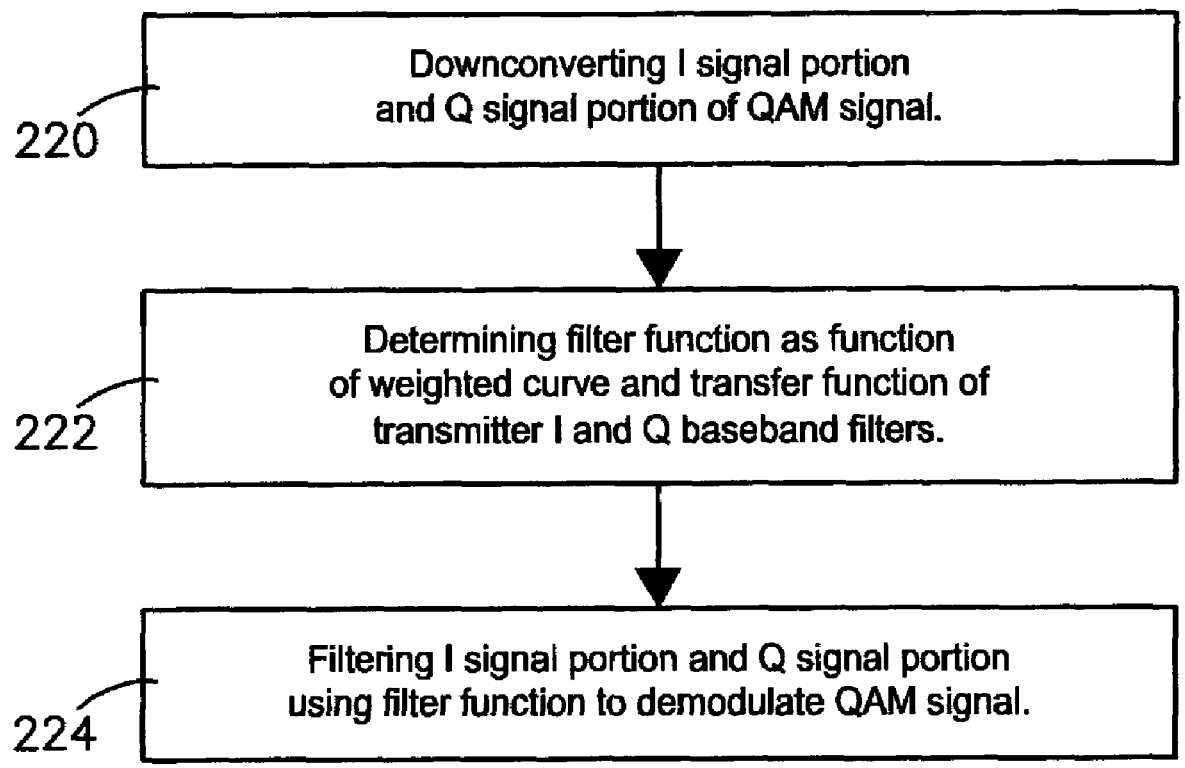
FIG. 13 is a block diagram of steps involved in a preferred embodiment of the method concerning a technique for demodulation filtering.

The technique is as follows. Referring to FIG. 13, an I signal portion and a Q signal portion of the QAM signal are downconverted, as depicted in box 220. Then, a filter function is determined as a function of a weighted curve giving greater weight to center and less weight to edge samples, and a transfer function of one or more transmitter I and Q baseband filters, as depicted in box 222. Lastly, the I signal portion and the Q signal portion are filtered using the filter function, as depicted in box 224.

A suitable frequency domain filter function is:

(weighted integrate and dump)/H(f), where H(f) is the transfer function for the transmitter I and Q baseband filters.

"Weighted integrate and dump" involves a weighted curve that has non-zero values over a period somewhat less than the symbol period and gives more weight to the center samples and less toward the edges. The shape of the weighted curve could be, for example, a Bell curve, a cosine, a circle, or a triangle. For example, in an application with a 40 ns symbol period, it was found that an optimal set of parameters uses a semi-circle weighting curve with non-zero values over a 28 ns period:

$$W=\sqrt{(1-x^2)}, x \text{ from } -k \text{ to } k, 0 < k \leq 1.$$

When x=−k, this corresponds to the start of the 28 ns period, and when x=k, this corresponds to the end of the 28 ns period. Outside of this 28 ns period, W=0. The best value found for k was 0.80.

EXAMPLE

The present invention has been used for telemetry transmitters used to transmit signals exoatmospheric, near the surface of the ocean, and through severe channel conditions that involved transmitting through a plasma, resulting in extreme and rapid signal scale variations. In these cases, the method has been implemented as a two-level polar sixteen QAM differential-phase/absolute-amplitude pseudo-constellation with sixteen evenly spaced differential phase values, separated by 22.5° increments, alternating between two absolute amplitude level values. Each pseudo-constellation point is given a unique phase, and each point on a given amplitude level is separated from the other nearest points on the same amplitude level by 45°. An absolute-phase/absolute-amplitude constellation comprising thirty-two points is required to generate the sixteen differential-phase/absolute-amplitude pseudo-constellation points. The optimal ratio of inner amplitude level to outer amplitude level is 0.63 for minimum BER. "Semi"-Gray-code bit assignment for the differential-phase/absolute-amplitude pseudo-constellation points is used. As mentioned, perfect Gray coding is not possible for a polar constellation.

Example Eb/No (dB)s Required for BER=1e−4

| Condition | Eb/No (dB) required for BER = 1e$^{-4}$ |
|---|---|
| coherent demod and matched filtering | 13.54 |
| coherent demod and transmitter filtering as used on HERT | 14.13 |
| incoherent demod and matched filtering | 15.34 |
| incoherent demod and transmitter filtering as used on HERT | 16.10 |

Example Transmit Spectrums

For an (unmatched) transmitter 15 MHz 5th order linear 0.5° equi-phase-ripple passive I and Q baseband filters incorporated into the HERT transmitter hardware, the transmitted spectral BW is as follows for 120 ns and 40 ns symbol periods:

| BW Definition | 120 ns symbol period, 33.3 Mbits/sec | 40 ns symbol period, 100 Mbits/sec |
|---|---|---|
| 3 dB BW | +/−3.5 MHz | +/−8.85 MHz |
| 99% power BW | +/−13 MHz | +/−17.4 MHz |

For the (unmatched) transmitter 5 MHz 5th order Bessel passive I and Q baseband filters incorporated into the HERT transmitter hardware, the transmitted spectral BW is as follows for a 120 ns symbol period:

| BW Definition | 120 ns symbol period, 33.3 Mbits/sec |
|---|---|
| 3 dB BW | +/−3.04 MHz |
| 99% power BW | +/−5.6 MHz |

Advantages.

From the preceding description it will be appreciated that the method of the present invention provides a number of substantial advantages over the prior art, including, for example, providing continuous phase and amplitude references, wherein phase is encoded differentially and amplitude is encoded absolutely. Additionally, the method allows for scaling the amplitudes of the differential-phase/absolute amplitude pseudo-constellation. Additionally, the method allows for advantageously tracking-out rapid and severe scale variations in the received multiple amplitude level QAM signal so that the signal can be successfully demodulated and the data retrieved. Additionally, the method allows for incoherent carrier recovery when coherent recovery is impossible due to e.g., frequency variations in the signal, thereby advantageously facilitating demodulation of the QAM signal and retrieval of the data. Additionally, the method allows for coherent carrier recovery that advantageously provides significant improvement in BER versus Eb/No over incoherent demodulation. Additionally, the method advantageously allows for equalizing frequency dependent multipath to deal with moderate and severe conditions of frequency dependent fading so that data can be successfully recovered from, for example, a high-speed telemetry QAM signal.

Although the invention has been described with reference to the preferred embodiments illustrated in the drawings, it is noted that equivalents may be employed and substitutions made herein without departing from the scope of the invention as recited in the claims. In particular, some or all of the various techniques disclosed herein may be used independently of some or all of the other techniques disclosed herein, and thus the overall method is not limited to inclusion and use of all of the various techniques. Furthermore, some or all of the various techniques can be implemented in hardware, firmware, or software, and have broad application to a variety of signal types and use contexts, including, for example, wireless or hardwired spectrally efficient high data rate digital communications.

Having thus described the preferred embodiment of the invention, what is claimed as new and desired to be protected by Letters Patent includes the following:

1. A method of recovering a carrier frequency from an input signal, wherein the signal has $2^N$ possible phase states, $N=\{0, 1, 2, \ldots\}$, the method comprising the steps of:
   (a) filtering the input signal with a bandpass filter around an intermediate frequency of the signal;
   (b) determining a limit amplitude value by—
      ($b_1$) determining an absolute value signal by determining the absolute value of the filtered signal of step (a), and
      ($b_2$) determining a mean of the absolute value signal of step ($b_1$) and dividing the mean by a pre-selected divisor to obtain a limit amplitude value;
   (c) limiting any positive and negative amplitude swings of the filtered signal of step (a) to the limit amplitude value;
   (d) filtering the signal resulting from the preceding steps, and
   (e) squaring the signal resulting from step (d);
   (f) repeating steps (d) and (e) N−1 times;
   (g) transforming the signal resulting from step (f);
   (h) determining a peak frequency response of the signal resulting from step (g) between about $2^N*$(a start frequency) and about $2^N*$(an end frequency); and
   (i) dividing the peak frequency response by $2^N$.

2. The method as set forth in claim 1, wherein the method is performed without benefit of a pilot carrier wave.

3. The method as set forth in claim 1, wherein the input signal is a quadrature amplitude modulated signal.

4. The method as set forth in claim 1, wherein the intermediate frequency of step (a) is a center frequency of the input signal.

5. The method as set forth in claim 1, wherein the limit amplitude value of step (b) is near a lowest constellation amplitude level.

6. The method as set forth in claim 1, wherein step (c) involves clipping the any positive and negative amplitude swings.

7. The method as set forth in claim 1, wherein step (c) involves applying a gradual compression curve.

8. The method as set forth in claim 1, wherein step (d) includes bandpass filtering the signal, where a variable, i, is incremented from 1 to N, in a range between about $2^{(i-1)}*$(the start frequency) and about $2^{(i-1)}*$(the end frequency).

9. The method as set forth in claim 1, wherein step (d) includes bandstop filtering the signal in a range between about $2^N*$(the start frequency) and about $2^N*$(the end frequency).

10. The method as set forth in claim 1, wherein step (g) involves a Fourier transform of the signal.

11. The method as set forth in claim 1, wherein the carrier signal, once incoherently recovered, is used to demodulate a set of absolute IQ points having an unknown phase shift.

12. The method as set forth in claim 1, further including the step of up-sampling the filtered signal of step (a), between steps (a) and (b) to increase a sample rate of the signal by a factor of $2^N$.

13. The method as set forth in claim 1, wherein step (d) includes bandstop filtering the signal in a range between about $2^N*$(the start frequency) and about $2^N*$(the end frequency).

14. The method as set forth in claim 1, further including the step of up-sampling the filtered signal of step (a), between steps (a) and (b) to increase a sample rate of the signal by a factor of $2^N$.

15. A method of recovering a carrier frequency from an input signal, wherein the signal has $2^N$ possible phase states, $N=\{0, 1, 2, \ldots\}$, the method comprising the steps of:
   (a) filtering the input signal with a bandpass filter around an intermediate frequency of the signal;
   (b) determining a limit amplitude value by—
      ($b_1$) determining an absolute value signal, by determining the absolute value of the filtered signal of step (a), and
      ($b_2$) determining a mean of the absolute value signal of step ($b_1$) and dividing the mean by a pre-selected divisor to obtain a limit amplitude value;
   (c) limiting any positive and negative amplitude swings of the filtered signal of step (a) to the limit amplitude value;
   (d) filtering the signal resulting from the preceding steps, and
   (e) squaring the signal resulting from step (d);
   (f) repeating steps (d) and (e) N−1 times;
   (g) filtering the signal resulting from step (f) using a bandpass filter; and
   (h) performing a frequency divide by $2^N$ operation on the signal resulting from step (g).

16. The method as set forth in claim 15, wherein the method is performed without benefit of a pilot carrier wave.

17. The method as set forth in claim 15, wherein the input signal is a $2^N$ phase state quadrature amplitude modulated signal.

18. The method as set forth in claim 15, wherein the intermediate frequency of step (a) is a center frequency of the input signal.

19. The method as set forth in claim 15, wherein the limit amplitude value of step (b) is near a lowest constellation amplitude value.

20. The method as set forth in claim 15, wherein step (c) involves clipping the any positive and negative amplitude swings.

21. The method as set forth in claim 15, wherein step (c) involves applying a gradual compression curve.

22. The method as set forth in claim 15, wherein step (d) includes bandpass filtering the signal, where a variable, i, is incremented from 1 to N, in a range between about $2^{(i-1)}*$(the start frequency) and about $2^{(i-1)}*$(the end frequency).

23. The method as set forth in claim 15, wherein the carrier signal, once incoherently recovered, is used to demodulate a set of absolute IQ points having an unknown phase shift.

* * * * *